(12) United States Patent
Hanson

(10) Patent No.: US 7,896,025 B2
(45) Date of Patent: Mar. 1, 2011

(54) VALVE BODY

(75) Inventor: James Richard Hanson, Brownsburg, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 914 days.

(21) Appl. No.: 11/824,211

(22) Filed: Jun. 29, 2007

(65) Prior Publication Data

US 2009/0001310 A1 Jan. 1, 2009

(51) Int. Cl.
*F16K 11/06* (2006.01)
(52) U.S. Cl. ............... 137/454.6; 137/625.4; 4/695
(58) Field of Classification Search .......... 137/454.6, 137/652.4; 4/695
See application file for complete search history.

(56) References Cited

U.S. PATENT DOCUMENTS

| 917,157 | A | | 4/1909 | Sandham |
|---|---|---|---|---|
| 1,855,359 | A | | 4/1932 | McNamara |
| 2,091,110 | A | | 8/1937 | Smallen |
| 2,296,128 | A | | 9/1942 | Weingarten |
| 2,396,138 | A | | 3/1946 | Vernet |
| 2,538,835 | A | | 1/1951 | Harvey et al. |
| 3,105,519 | A | | 10/1963 | Fraser |
| 3,506,036 | A | * | 4/1970 | Hare ............ 137/636.3 |
| 3,533,436 | A | * | 10/1970 | Parkison ........... 137/359 |
| 3,756,276 | A | | 9/1973 | Katva |
| 4,618,091 | A | | 10/1986 | Buzzi |
| 4,681,140 | A | | 7/1987 | Hayman |
| 5,331,997 | A | * | 7/1994 | Bosio ............ 137/270 |
| 5,340,018 | A | | 8/1994 | MacDonald |
| 5,822,811 | A | * | 10/1998 | Ko .................. 4/678 |
| 6,085,984 | A | | 7/2000 | Chamot et al. |
| 6,370,712 | B1 | | 4/2002 | Burns et al. |
| 6,434,765 | B1 | * | 8/2002 | Burns et al. ........... 4/676 |
| 6,557,770 | B2 | | 5/2003 | Mace et al. |
| 6,644,333 | B2 | | 11/2003 | Gloodt |
| 6,651,271 | B2 | | 11/2003 | Bentley |
| 6,708,895 | B1 | | 3/2004 | Knapp |
| 6,823,892 | B1 | | 11/2004 | Knapp |
| 6,918,400 | B2 | | 7/2005 | Buchner et al. |
| 7,066,204 | B2 | | 6/2006 | Marty |
| 7,174,581 | B2 | | 2/2007 | McNerney et al. |
| 7,175,158 | B2 | | 2/2007 | Thomas |
| 2004/0173688 | A1 | | 9/2004 | Gloodt |

FOREIGN PATENT DOCUMENTS

WO WO 2005/103853 A1 11/2005

OTHER PUBLICATIONS

KWC 802259 Trim-Set Installation and service instruction, 8 pgs., at least as early as Jun. 29, 2007.
Vernet Magnum Corp. Thermostatic Cartridges, web page, 1 pg., at least as early as Jun. 29, 2007.
Vernet CA43 Thermostatic Cartridge Technical Datas, 2 pgs., at least as early as Jun. 29, 2007.
Grohe America, Inc., F1 Thermostatic Roman Rub Filler Trim, 34 142-Tub, at least as early as Mar. 26, 2007, 3 pgs.
Grohe America, Inc., Thermostatic Roman Rub Filler Deck Mount, at least as early as Mar. 26, 2007, 3 pgs.

* cited by examiner

*Primary Examiner*—John Fox
(74) *Attorney, Agent, or Firm*—Baker & Daniels LLP

(57) ABSTRACT

A valve assembly for controlling water flow to a water delivery device. The valve assembly includes a valve body and a valve cartridge sealingly received within the valve body.

11 Claims, 15 Drawing Sheets

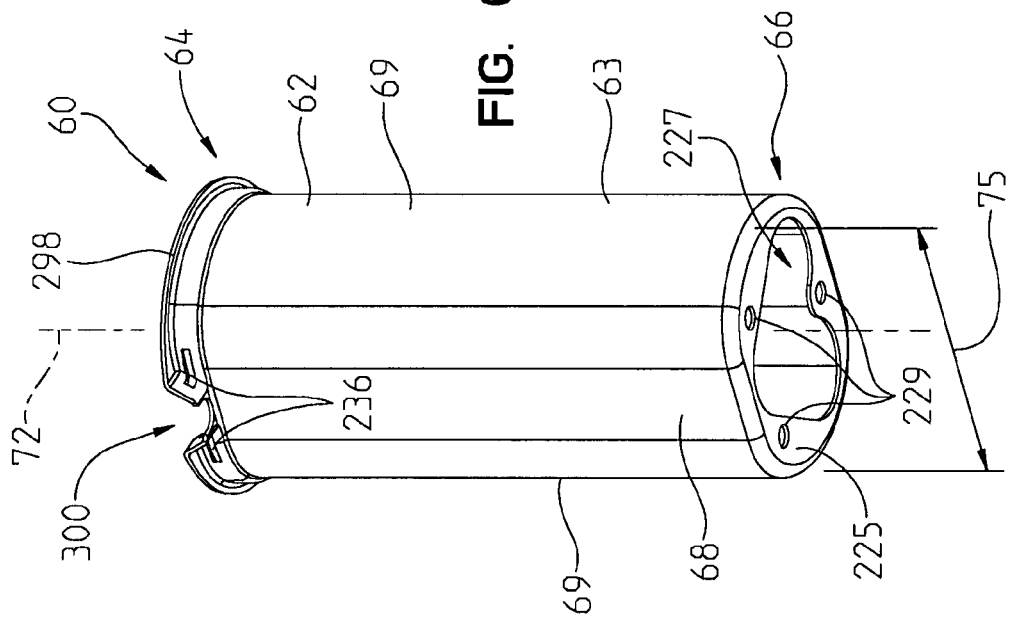
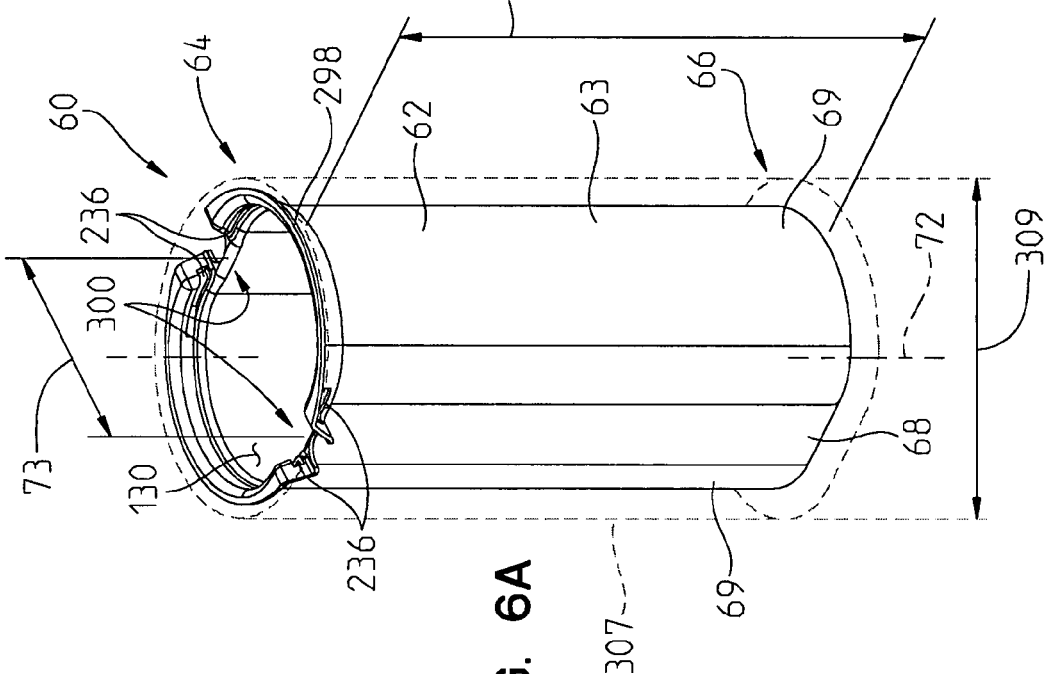

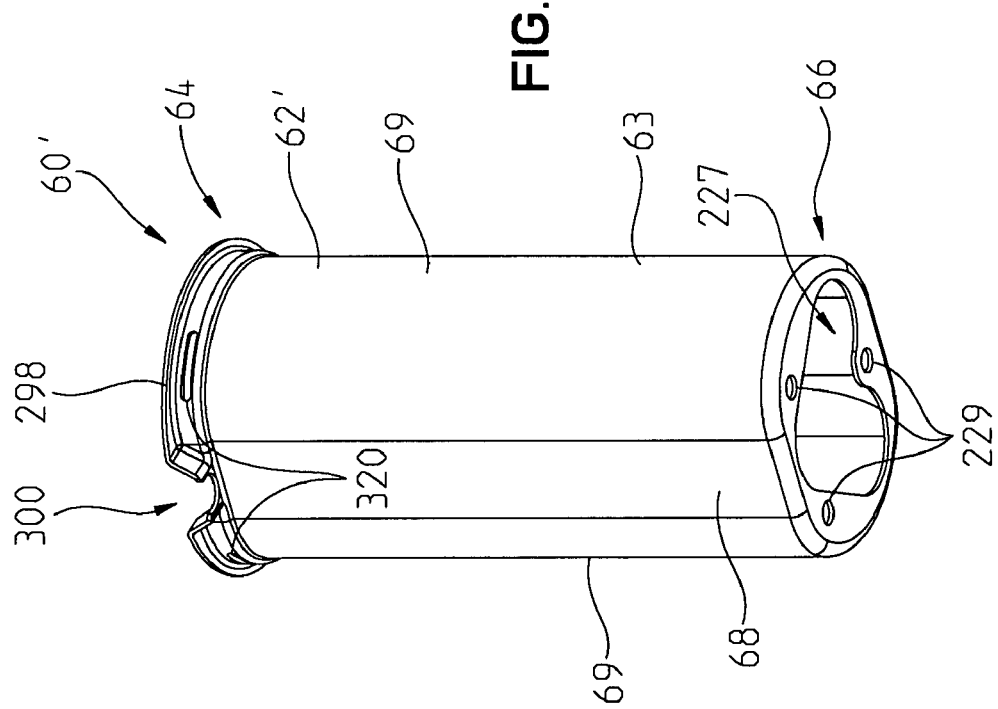
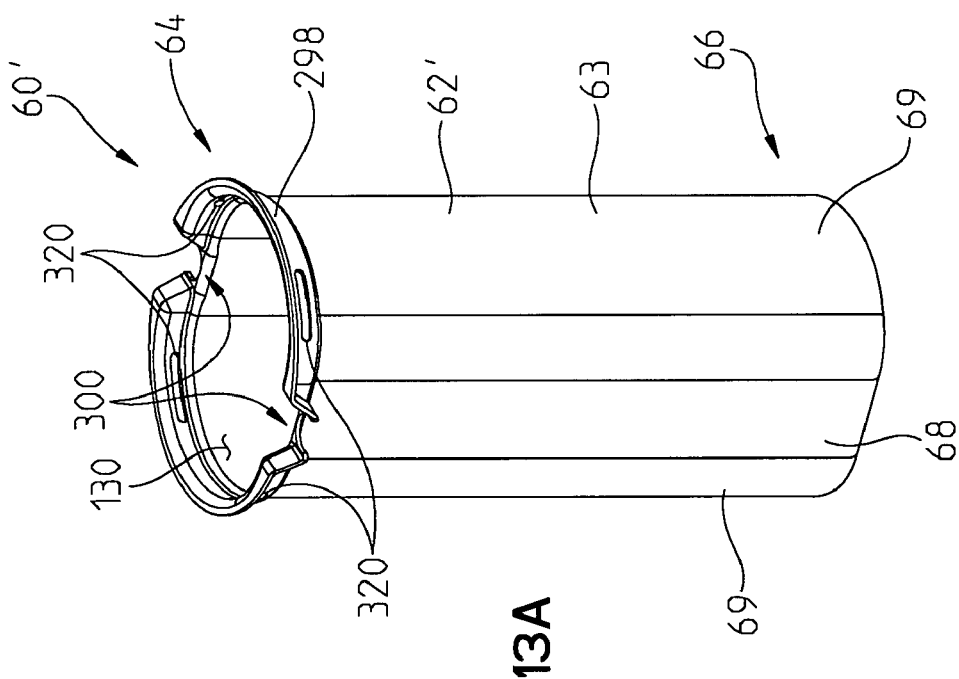

VALVE BODY

CROSS-REFERENCE TO RELATED APPLICATION

This application is related to U.S. patent application Ser. No. 11/823,896, filed Jun. 29, 2007, entitled "MULTI-HANDLE THERMOSTATIC FAUCET".

BACKGROUND AND SUMMARY OF THE INVENTION

The present invention relates generally to faucets and, more particularly, to a valve body for mounting to the deck of a Roman tub.

Many bathrooms include bathtubs that are separate from a shower enclosure. Such bathtubs, often called Roman tubs, may have deck-mounted faucets instead of conventional wall-mounted faucets. Such Roman tub faucets are typically mounted on a horizontal ledge, or mounting deck, extending at least partially around the perimeter of the tub. Roman tub faucets often include a delivery spout fluidly coupled to hot and cold water supplies through hot and cold inlet valves, respectively. Roman tub faucets often also include a handheld shower sprayer that is fluidly coupled to the water supplies through a diverter valve. As such, water may be delivered to either the delivery spout or to the handheld sprayer.

In response to various plumbing codes, certain Roman tub faucets include a thermostatic mixing valve to provide scald protection by limiting and regulating the maximum outlet hot water temperature, typically to 120 degrees Fahrenheit (48.89 degrees Celsius) or less. Such plumbing codes often adopt the anti-scald performance and characteristic requirements of ASSE (American Society of Sanitary Engineering) 1070. While currently not widely adopted by plumbing codes in connection with Roman tub faucets including hand sprayers, ASSE 1016 provides for not only scald protection, but also thermal shock protection. Thermal shock protection protects the hand sprayer user from sudden changes in outlet temperature resulting from hot or cold water supply pressure variations. Currently, ASSE 1016 is generally limited to fixed showers and does not apply to tub fillers. However, this additional thermal shock protection further improves bather safety and/or comfort in connection with typical Roman tub faucets.

While thermostatic mixing valves have been installed within vertical walls for tub/shower installations, under sink decks for kitchen and lavatory applications, and below tub decks for deck mounted Roman tub faucets, access has often proved difficult. For instance, in Roman tub installations, the valve component are typically enclosed below the tub deck, making access difficult after installation. Thermostatic valves typically require periodic maintenance, and there is often no convenient means to access them for service. More particularly, access to deck mounted thermostatic valves may require breaking out portions of the deck, and/or removing access panels in order to maneuver tools beneath the deck in order to reach the underside of the valve.

Additionally, conventional thermostatic valves have typically included relatively large cast valve bodies requiring significant spacing between other faucet components, such as the flow control valve and the delivery spout. Given the limited surface area often available on Roman tub mounting decks, reducing the size of thermostatic valves is desirable for conserving space.

As such, there is a need for a thermostatic faucet which controls the maximum temperature of hot water passing through a fluid delivery device and is easily accessible for periodic maintenance. There is an additional need for a thermostatic faucet which satisfies the anti-scald requirements of ASSE 1070 and the thermal shock requirements of ASSE 1016. Further, it is desired to provide a thermostatic valve having a compact size and which is easily installed.

According to an illustrative embodiment of the present disclosure, a faucet includes a delivery spout having an outlet and configured to be mounted to a horizontal mounting deck. A temperature control unit is configured to be mounted to the horizontal mounting deck along a first vertical axis and to control the temperature of water supplied to the outlet. The temperature control unit includes a first holder configured to be coupled to, and extend below, the horizontal mounting deck, and a first valve assembly and supported by the first holder. A hot water line is supported by the first holder and is releasably fluidly coupled with the first valve assembly. A cold water inlet line is supported by the first holder and is releasably fluidly coupled with the first valve assembly. An outlet water line is supported by the first holder and is releasably fluidly coupled with the first valve assembly. A flow control unit is configured to be mounted to the horizontal mounting deck along a second vertical axis and to control the flow rate of water supplied to the outlet. The flow control unit includes a second holder configured to be coupled to, and extend below, the horizontal mounting deck in spaced relation to the first holder. A second valve assembly is fluidly coupled to the first valve assembly and is supported by the second holder. The delivery spout, the temperature control unit, and the flow control unit are configured for mounting to the horizontal deck within a footprint having a width of less than 4 inches, a length less than 10 inches, and an area less than 40 square inches.

Illustratively, the first valve assembly is configured to be removed from the first holder in an upward direction along the vertical axis from above the mounting deck without uncoupling the first holder from the deck by releasing a first retainer and fluidly uncoupling the hot water inlet line and the cold water inlet line. Further illustratively, the second valve assembly is configured to be removed from the second holder in an upward direction from above the mounting deck without uncoupling the second holder from the mounting deck by releasing a second retainer.

According to a further illustrative embodiment of the present disclosure, a thermostatic valve includes a holder configured to be coupled to a mounting deck, the holder including a body extending along a longitudinal axis between opposing ends. A thermostatic cartridge is received within the body of the holder. A hot water inlet is in fluid communication with the thermostatic cartridge and is configured to be fluidly coupled to a hot water supply. A cold water inlet is in fluid communication with the thermostatic cartridge and is configured to be fluidly coupled to a cold water supply. A mixed water outlet is in fluid communication with the thermostatic cartridge. The thermostatic cartridge is configured to control the temperature of water flowing through the mixed water outlet. The holder is sized to fit within a dimensional envelope having a lateral cross-sectional diameter of less than 2.5 inches (63.5 millimeters).

According to another illustrative embodiment of the present disclosure, a valve includes a holder configured to be coupled to a mounting deck, the holder including a body extending between upper and lower ends, and a retaining lip extending outwardly from the body proximate the upper end. A valve cartridge is received within the holder, and a retainer releasably couples the valve cartridge to the holder. A flange includes a plurality of interlocking members and is configured to be positioned intermediate the retaining lip of the holder and the mounting deck. In a further illustrative embodiment, a securing member is positioned below the flange and outside of the holder, and at least one adjustment member extends substantially parallel to the holder and is operably coupled to the securing member for driving the securing member in motion relative to the flange.

According to a further illustrative embodiment of the present disclosure, a mixing valve includes a mixing cartridge defining a longitudinal axis and including a chamber. At least one cold water port is in fluid communication with the chamber, and at least one hot water port is in fluid communication with the chamber. A tri-axial adapter includes opposing upper and lower ends, a cold water inlet, a hot water inlet, and a mixed water outlet. The cold water inlet, the hot water inlet, and the mixed water outlet extend from the lower end of the tri-axial adapter substantially parallel to the longitudinal axis. A flow divider is operably coupled to the tri-axial adapter and defines a cold water passageway from the cold water inlet to the mixing cartridge, and a hot water passageway from the hot water inlet to the mixing cartridge. The cold water passageway is in fluid communication with the at least one cold water port of the mixing cartridge, and the hot water passageway is in fluid communication with the at least one hot water port of the mixing cartridge.

According to yet another illustrative embodiment of the present disclosure, a valve assembly for controlling water flow to a water delivery device includes a valve body formed of a malleable metal. The valve body includes a sidewall extending between opposing first and second ends along a longitudinal axis. The sidewall includes a wall thickness, and a length between the first and second ends. The sidewall defines a cross-sectional major dimension extending laterally to the longitudinal axis, and a cross-sectional minor dimension extending laterally to the longitudinal axis and perpendicular to the cross-sectional major dimension. The ratio of the length to the major dimension is greater than 1, and the ratio of the major dimension to the wall thickness is greater than 30. A valve cartridge is sealingly received within the valve body, such that the valve body is substantially watertight.

According to a further illustrative embodiment of the present disclosure, a valve body is configured to be fluidly coupled with a water delivery device. The valve body includes a sidewall formed of a malleable metal and extending between opposing first and second ends along a longitudinal axis. The sidewall has a wall thickness and a length. The sidewall defines a cross-sectional major dimension extending laterally to the longitudinal axis. The wall thickness is between 0.01 inches and 0.125 inches. The ratio of the length to the major dimension is greater than 1.

According to another illustrative embodiment of the present disclosure, a valve assembly includes a valve body having a sidewall extending between opposing first and second ends along a longitudinal axis, and an end wall at the second end having an opening. A valve cartridge is received within the valve body, and a plurality of conduits extend through the opening of the end wall. A receiver is sealingly received within the sidewall proximate the end wall, the receiver fluidly coupling the plurality of conduits with the valve cartridge.

Additional features and advantages of the present invention will become apparent to those skilled in the art upon consideration of the following detailed description of the illustrated embodiment exemplifying the best way of carrying out the invention as presently perceived.

BRIEF DESCRIPTION OF THE DRAWINGS

The detailed description of the drawings particularly refers to the accompanying figures in which:

FIG. 6A is a first perspective view of the holder of FIG. 3;

FIG. 6B is a second perspective view of the holder of FIG. 3;

FIG. 13A is a first perspective view of the holder of FIG. 12;

FIG. 13B is a second perspective view of the holder of FIG. 12;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. Although the disclosure is described in connection with water, it should be understood that additional types of fluids may be used. Additionally, while the thermostatic faucet disclosed herein is shown for use with a Roman tub, it should be appreciated that it may be incorporated for use with other faucets, including lavatory, kitchen, bar, utility, and commercial faucets.

Figure 1:
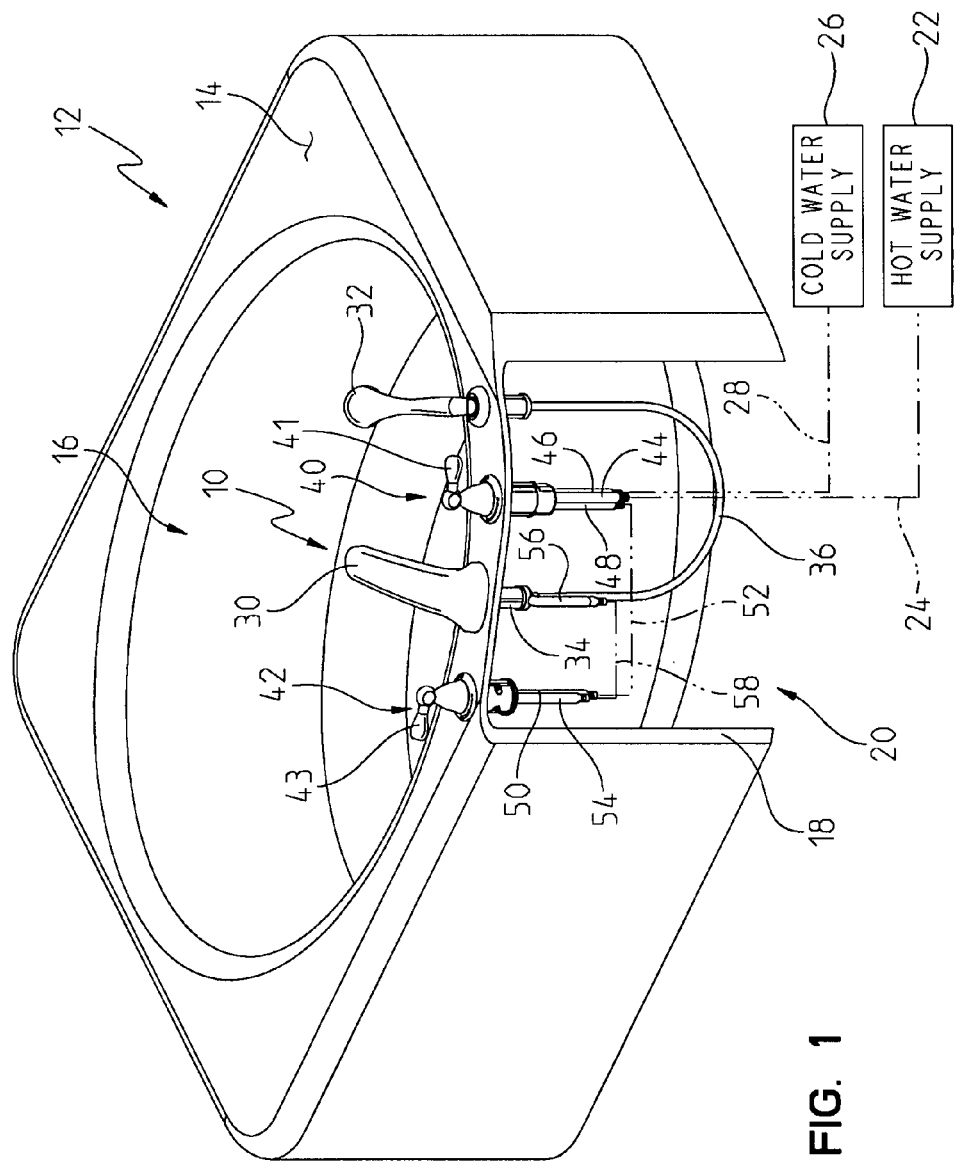
FIG. 1 is a perspective view of an illustrative embodiment Roman tub, fluidly coupled to hot and cold water supplies, with a partial cutaway thereof to show details of the thermostatic faucet positioned beneath the bathtub deck.

Referring initially to FIG. 1, a multi-handle thermostatic faucet 10 of the present disclosure is shown for use with a Roman tub 12. The Roman tub 12 includes a horizontal mounting deck 14 having an upper surface 15 supported above and surrounding a basin 16. An outer sidewall 18 extends downwardly from the deck 14 in spaced relation to the basin 16, thereby defining a space 20 therebetween. A portion of the sidewall 18 has been removed in FIG. 1 to show components of the faucet 10 positioned within space 20, below the deck 14 and normally hidden by the sidewall 18.

The faucet 10 is fluidly coupled to a hot water supply 22 through a fluid line 24, and is fluidly coupled to a cold water supply 26 through a fluid line 28. Mixed outlet water is supplied to an outlet supported by a water delivery device, such as a delivery spout 30 or a handheld sprayer or shower 32, through operation of a conventional diverter valve 34. More particularly, the delivery spout 30 and the handheld shower 32 are both fluidly coupled to the diverter valve 34 which toggles flow between the spout 30 and the handheld shower 32 in response to operation of the handheld shower 32. The handheld shower 32 may be of conventional design and illustratively includes an actuation valve (not shown), such that flow of water may be activated therefrom. A flexible hose 36 connects the handheld shower 32 to the diverter valve 34. The diverter valve 34 may be of conventional design. An illustrative diverter valves 34 is detailed in U.S. Pat. No. 7,066,204, the disclosure of which is expressly incorporated by reference herein.

Figure 2A:
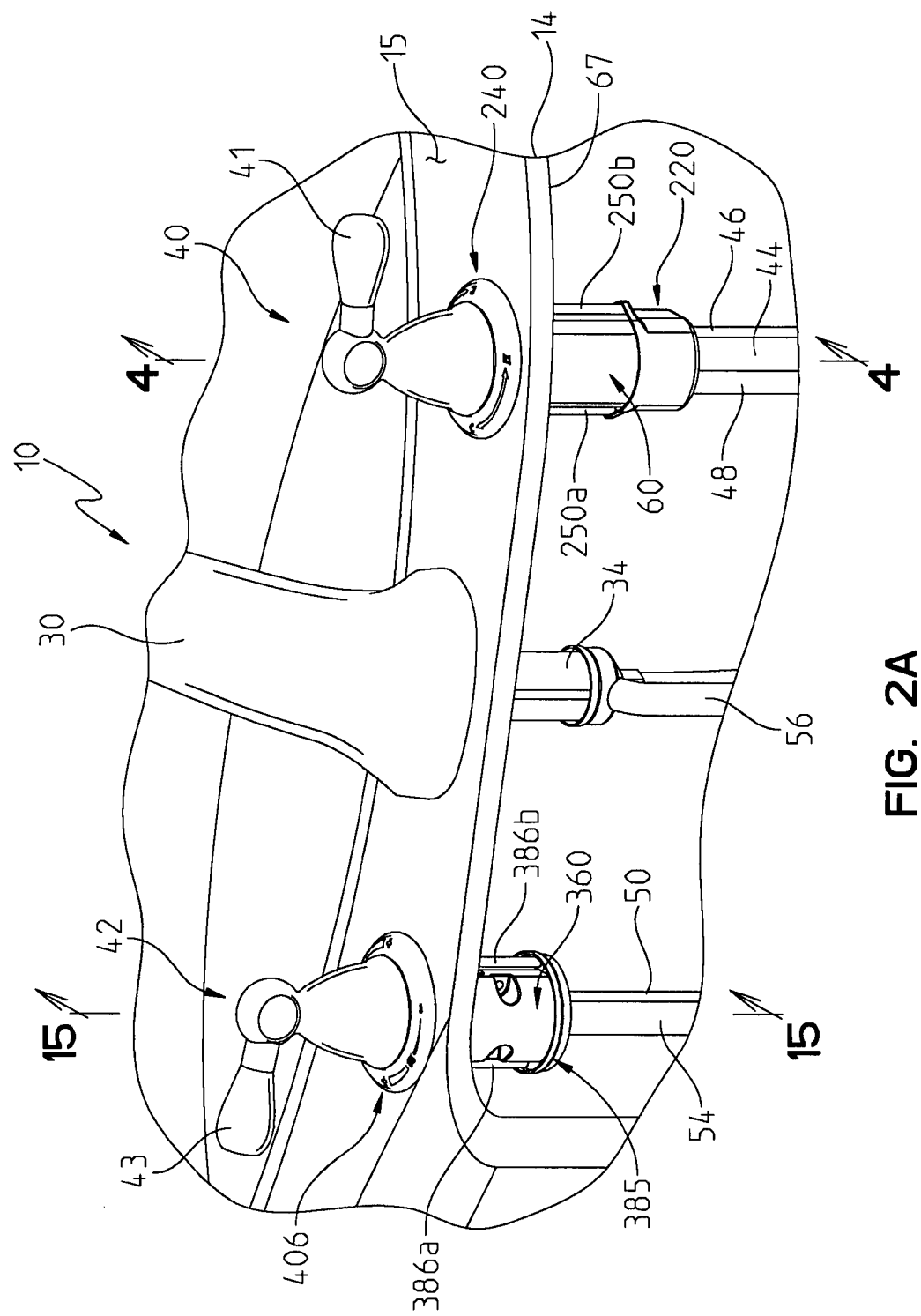
FIG. 2A is a detailed perspective view of the thermostatic faucet of FIG. 1.

With reference to FIGS. 1 and 2, the thermostatic faucet 10 includes a first or temperature control unit 40, and a second or flow control unit 42 positioned downstream from the temperature control unit 40. The temperature control unit 40 is operated by rotation of a temperature control handle 41, while the flow control unit 42 is operated by rotation of a flow control handle 43. As shown in FIGS. 1 and 2, the handles 41 and 43 are supported above the upper surface 15 of the deck 14, while the majority of the operative components of the temperature control unit 40 and the flow control unit 42 are positioned below the deck 14 within space 20, as detailed above.

Figure 2B:
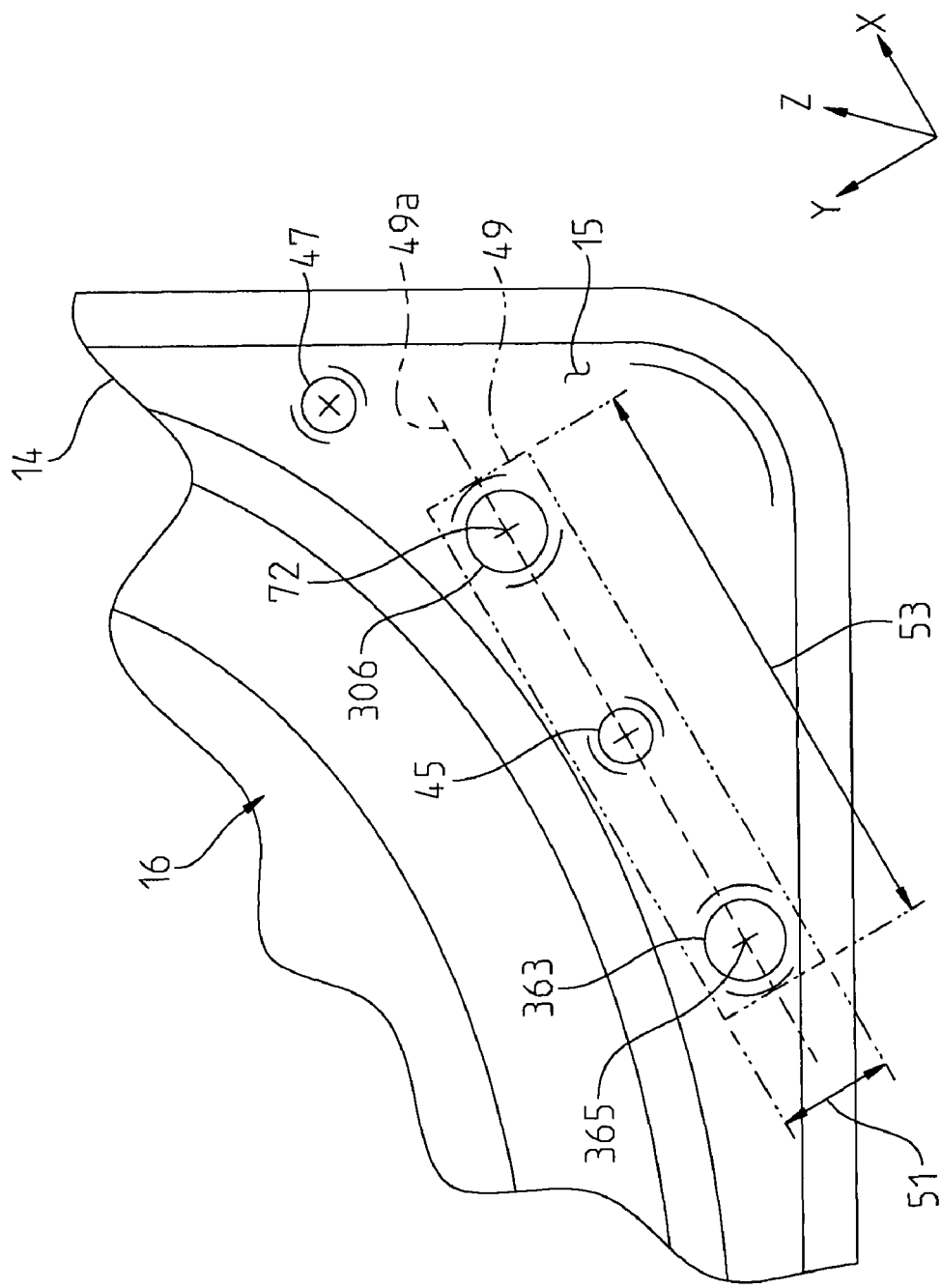
FIG. 2B is a detailed top plan view of the mounting deck of FIG. 2A.

As shown in FIG. 2B, a plurality of mounting holes 306, 363, 45, and 47 extend vertically through the deck 14 (parallel to a z axis) and are configured to receive portions of the temperature control unit 40, the flow control unit 42, the delivery spout 30, and the handheld shower 32, respectively. As further detailed herein, the components of the faucet 10, and in particular the temperature control unit 40, are sized to conserve space and, as such, are received within a compact rectangular mounting footprint 49 on the deck 14. In other words, the structure of the temperature control unit 40, the flow control unit 42, and the delivery spout 30 is configured to fit within a dimensional box or envelope, wherein any horizontal cross-section (in the plane defined by the x and y axes) taken along the vertical axis (z axis) defines the footprint 49. The vertically extending longitudinal axes 72 and 365 of the temperature control unit 40 and the flow control unit 42 are configured to be positioned within 6.1 inches (15.5 millimeters) of each other when the control units 40 and 42 are aligned with the delivery spout 30 along a horizontal mounting axis 49a. The mounting hole 45 is illustratively positioned equidistance between the mounting holes 306 and 363. Such a mounting arrangement permits the control units 40 and 42 and the delivery spout 30 to be mounted within footprint 49 having a width 51 of less than 4 inches (101.6 millimeters) and a length 53 of less than 10 inches (254 millimeters). As such, the area (width 51 multiplied by length 53) of the footprint 49 is less than 40 square inches (258 square millimeters). In one illustrative embodiment, the footprint 49 has a width 51 substantially equal to 3.1 inches, a length 53 substantially equal to 9.6 inches, and an area substantially equal to 29.5 inches.

The temperature control unit 40 includes a hot water inlet 44 coupled to the hot water supply 22 by fluid line 24, and a cold water inlet 46 fluidly coupled to the cold water supply 26 by fluid line 28. The temperature control unit 40 further includes an outlet 48 fluidly coupled to an inlet 50 of the flow control unit 42 through a connecting line 52. The flow control unit 42 further includes an outlet 54 fluidly coupled to an inlet 56 of the diverter valve 34 through a connecting line 58. The hot water inlet 44, the cold water inlet 46, the outlet 48, the inlet 50, the outlet 54, and the inlet 56 are all illustratively formed by copper tubes or conduits. As shown in FIGS. 4, 5, 14, and 15, fittings 44a, 46a, 48a, 50a, and 54a may be integrally formed within the conduits to facilitate coupling with polymeric tubing, such as that formed from cross-linked polyethylene (PEX). Alternatively, copper tubing may be coupled to the hot water inlet 44, the cold water inlet 46, the outlet 48, the inlet 50, and the outlet 54 by cutting off the respective fittings 44a, 46a, 48a, 50a, and 54a and sweating together the desired components in a known manner.

Figure 3:
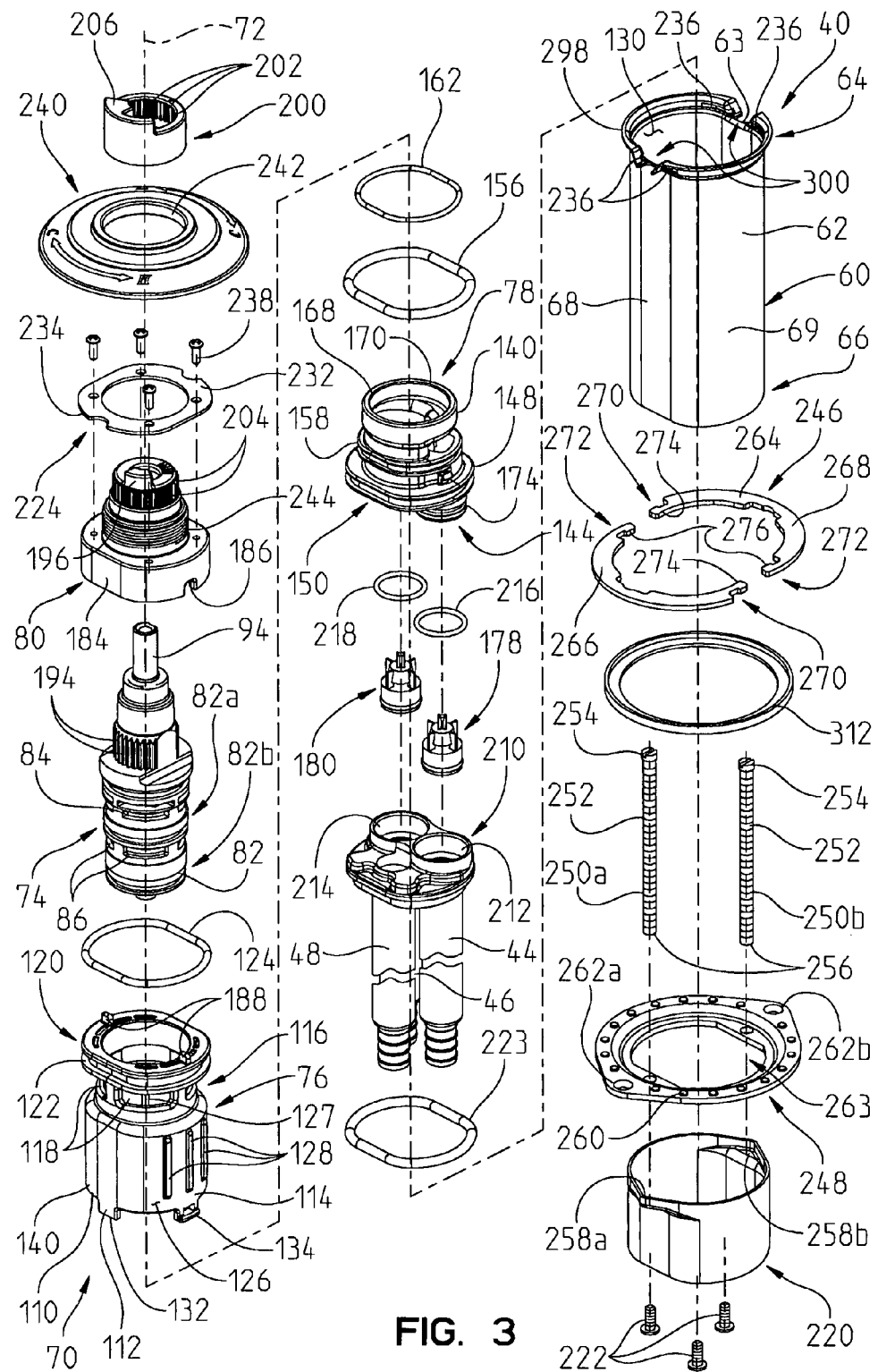
FIG. 3 is an exploded perspective view of the temperature control unit of the thermostatic faucet of FIG. 1.
Figure 4:
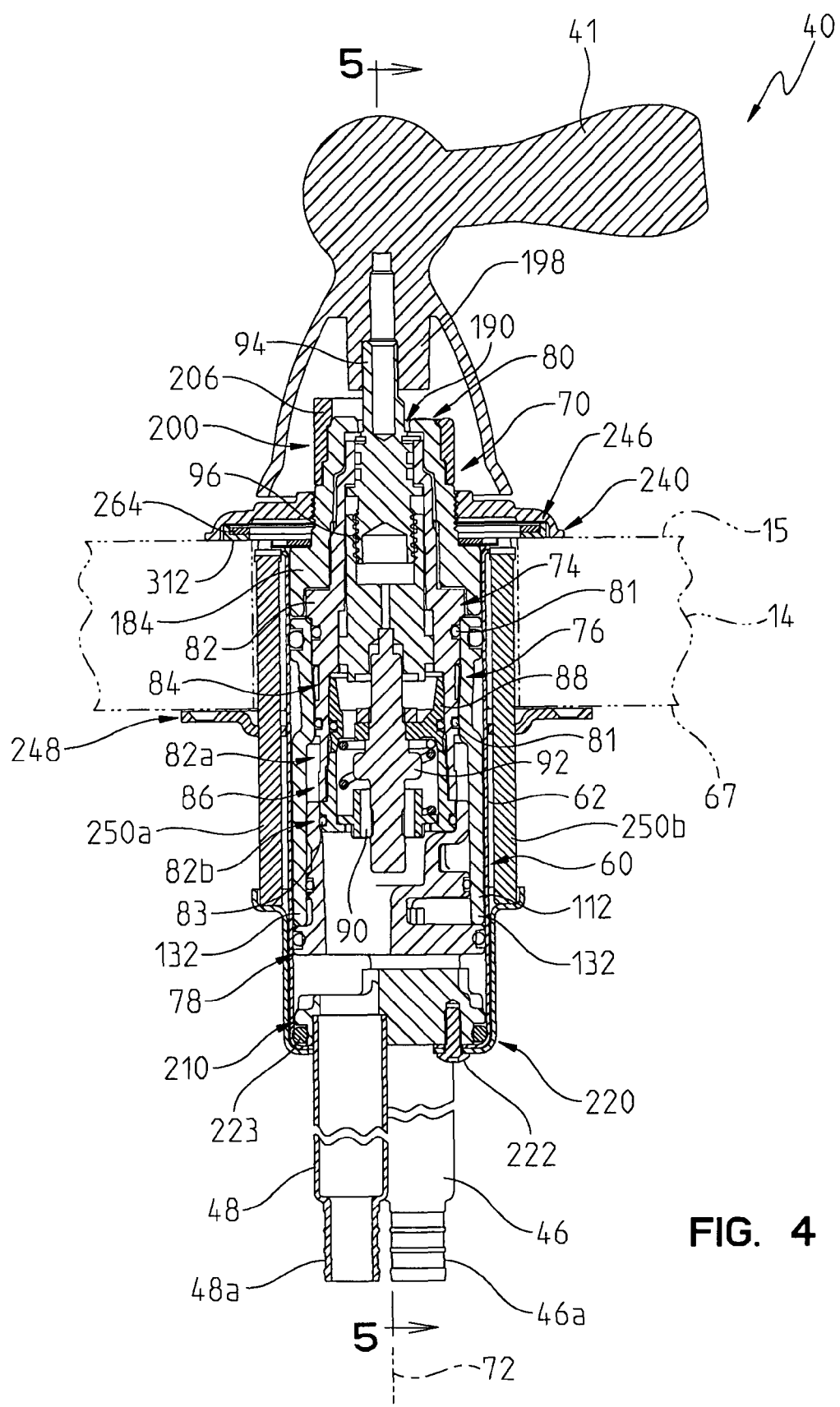
FIG. 4 is a cross-sectional view of the temperature control unit taken along line 4-4 of FIG. 2.
Figure 5:
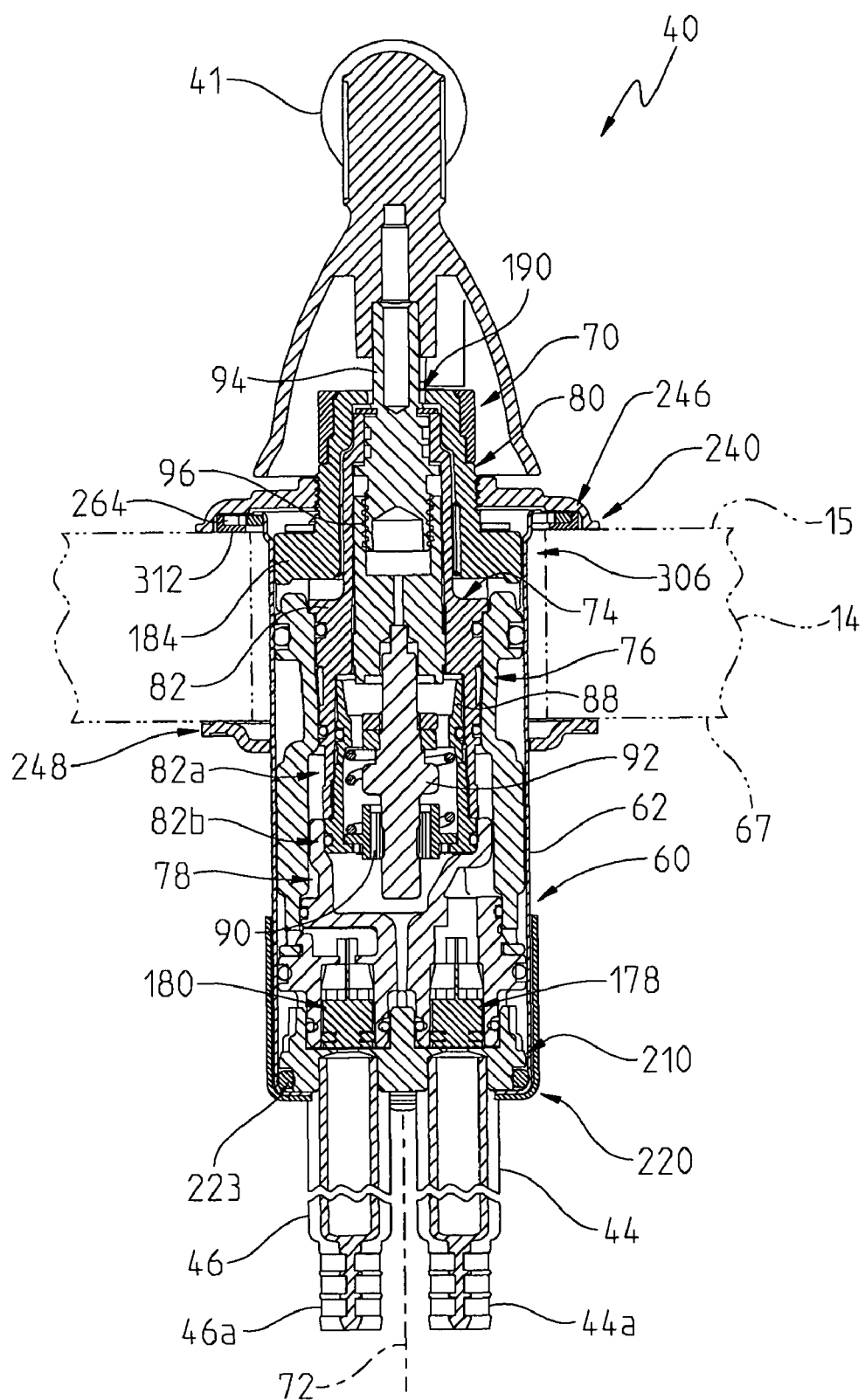
FIG. 5 is a cross-sectional view of the temperature control unit taken along line 5-5 of FIG. 4.

Referring now to FIGS. 3-5, illustrative embodiment temperature control unit 40 is shown as including a first holder 60 having a first valve body 62 with a sidewall 63 extending between an upper end 64 and an opposing lower end 66. The upper end 64 is positioned proximate the upper surface 15 of the mounting deck 14, while the lower end 66 is positioned below the lower surface 67 of the deck 14. Illustratively, the body 62 is formed of a durable metal having high burst strength. In one illustrative embodiment, the body 62 is formed of a lead-free malleable metal, such as stainless steel or brass. More particularly, the holder 60 is illustratively formed by a deep drawing process. Deep drawing is a known plastic deformation process in which a blank, typically a flat sheet or plate, if formed into a recessed, three-dimensional part with a depth several times the thickness of the metal. As a punch descends into a die (or the die moves upward over a punch), the metal assumes the configuration of the mating punch and die tooling. While the holder 60 is illustratively formed by deep drawing, it should be appreciated that other processes may be substituted therefor, such as hydroforming, spinning, elastoforming, stamping, and extruding the material.

As shown in FIGS. 6A and 6B, the body 62 of the holder 60 illustratively includes a sidewall 63 having a non-circular shape formed by flat or planar portions 68 and arcuate portions 69, thereby defining a double-D cross-section as taken along a laterally extending plane. As further detailed herein, the double-D cross-sectional configuration of the sidewall 63 facilitates installation of the temperature control unit 40 to the deck 14. The sidewall 63 of the holder 60 illustratively has a thickness 65 (FIG. 8) ranging from 0.01 inches (0.25 millimeters) to 0.125 inches (3.18 millimeters). In the illustrative embodiment, the thickness of the sidewall 63 is about 0.03 inches (0.8 millimeters). Further, the illustrative embodiment of FIGS. 6A and 6B, body 62 of holder 60 has a height 71 or length (between opposing ends 64 and 66) of approximately 4.38 inches (111.3 millimeters), a width 73 (between opposing flat portions 68) of approximately 1.7 inches (43.2 millimeters), and a depth 75 (between opposing arcuate portions 69) of approximately 2 inches (51 millimeters).

As noted above, the temperature control unit 40 is configured to conserve mounting deck space. As such, the body 62 of the holder 60 has cross-sectional or lateral dimensions configured to reduce the mounting footprint 49 detailed above. In the illustrative embodiment, the width 73 of body 62 defines a cross-sectional minor dimension extending laterally to the longitudinal axis 72, while the depth 75 of body 62 defines a cross-sectional major dimension extending laterally to the longitudinal axis 72 and perpendicular to the width 73. The major dimension is defined herein as the largest cross-sectional dimension of the body 62 extending transverse or laterally to the longitudinal axis 72. Illustratively, the ratio of the length 71 of the body 62 to the major dimension or depth 75 (L/D) is greater than 1, while the ratio of the major dimension 75 to the wall thickness 65 (D/t) is greater than 30. In one illustrative embodiment, L/D is substantially equal to 2.2, and D/t is substantially equal to 66.

Figure 7:
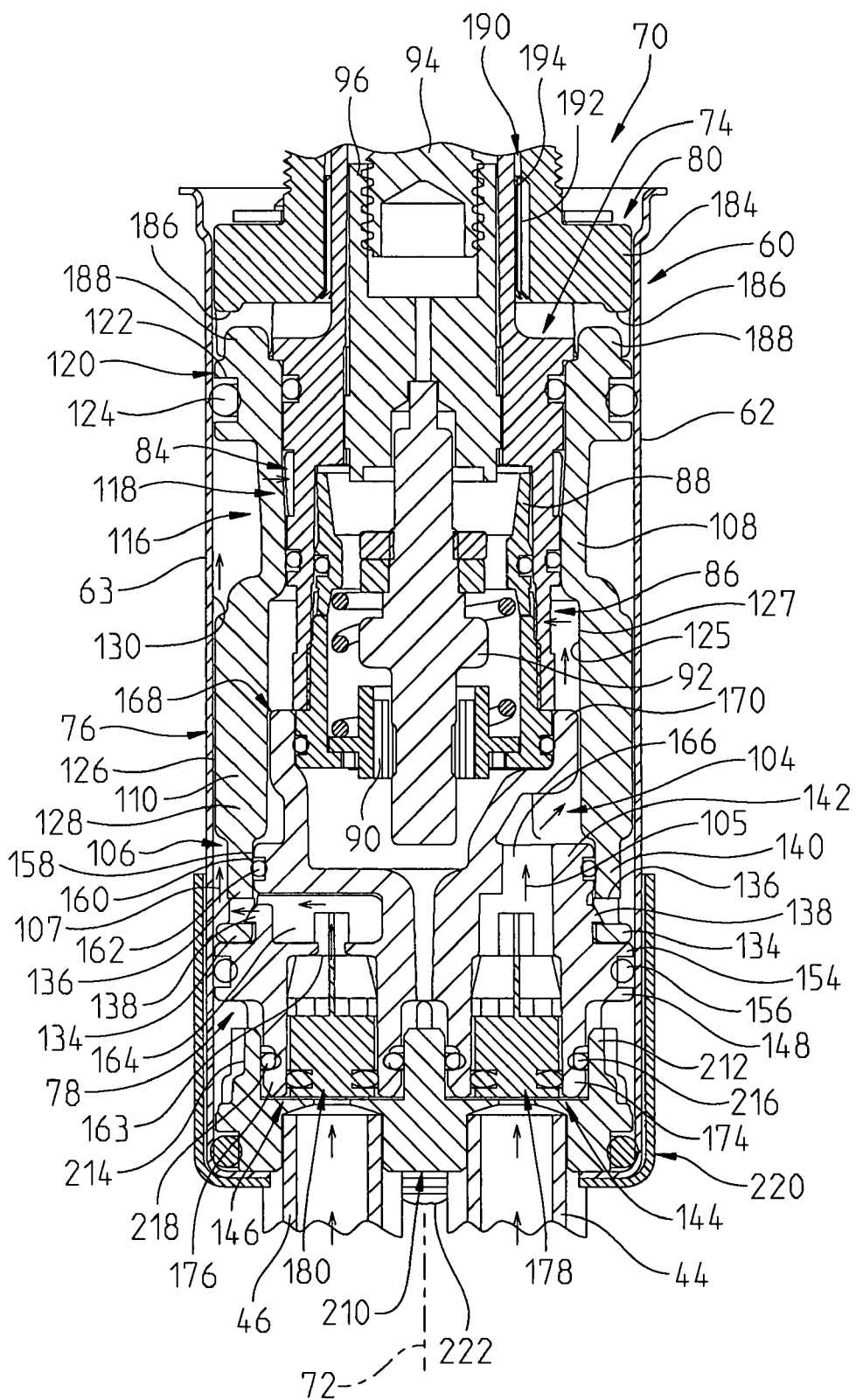
FIG. 7 is a detailed cross-sectional view of FIG. 5, showing hot and cold water passageways.
Figure 8:
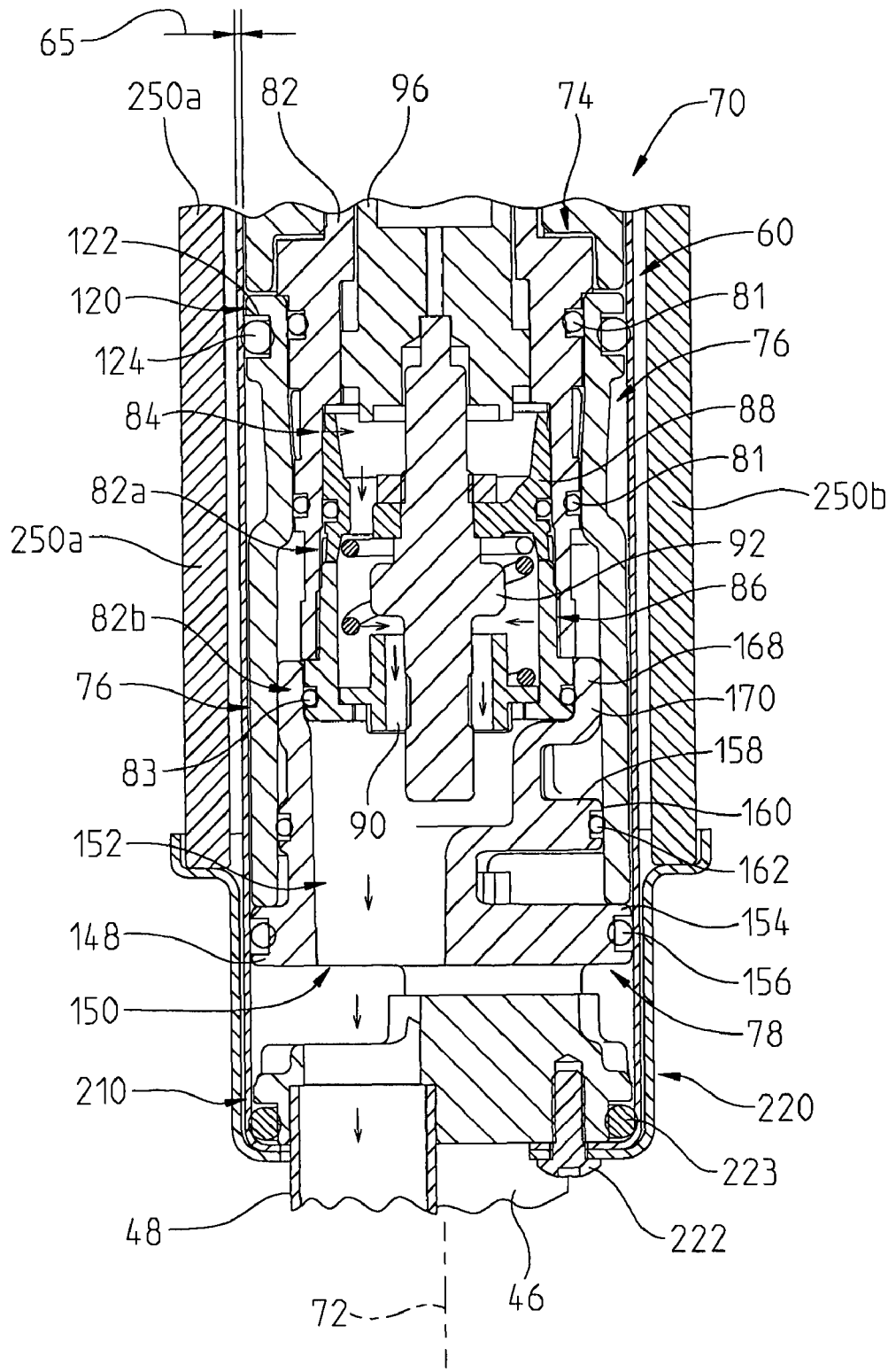
FIG. 8 is an detailed cross-sectional view of FIG. 4, showing hot and cold water openings within the thermostatic engine leading to a mixed water outlet passageway.

With reference to FIGS. 3, 7, and 8, a first or mixing valve assembly, illustratively a thermostatic valve assembly 70, is supported by the holder 60. The thermostatic valve assembly 70 defines a vertically extending longitudinal axis 72 and is received within the body 62 of the holder 60. The thermostatic valve assembly 70 includes a mixing cartridge, illustratively a thermostatic cartridge 74, received within a flow divider 76 and a tri-axial adapter 78. As further detailed herein, the flow divider 76 is fluidly coupled with the tri-axial adapter 78. The thermostatic valve assembly 70 further includes a cap 80 operably coupled to the thermostatic cartridge 74.

The thermostatic cartridge 74 may be of conventional design and illustratively comprises a thermostatic cartridge similar to Model No. CA43 available from Vernet S.A. of Ollainville, France. The thermostatic cartridge 74 includes a hollow outer envelope or housing 82 having a generally cylindrical shape extending axially along the longitudinal axis 72. A flow receiving portion 82a of the housing 82 is received within the flow divider 76 and sealed thereto by o-rings 81. A lower end 82b of the housing 82 is received within the tri-axial adapter 78 and sealed thereto by an o-ring 83. First or upper radial openings 84, and second or lower radial openings 86 are formed within the flow receiving portion 82a of the housing 82. Illustratively, the housing 82 includes two series of four circumferentially spaced arc-shaped openings 84 and 86, the two series being longitudinally spaced apart from each other. The upper radial openings 84 are configured to receive cold water supplied by the cold water inlet 46, while the lower radial openings 86 are configured to receive hot water supplied by the hot water inlet 44. Each of the openings 84 and 86 may be provided with a filter, for example, perforated stainless steel strip (not shown).

A slide 88 is supported for movement within the housing 82 of the thermostatic cartridge 74. More particularly, the slide 88 may be moved for adjusting the temperature of the mixture of cold and hot water by varying the flow cross-sections of cold and hot water passing through the openings 84 and 86, respectively. The mixed water exits the housing 82 through an outlet 90.

An expendable thermostatic element or engine 92 is operably coupled to the slide 88. The thermostatic element 92 illustratively includes an expandable wax that urges the slide 88 to move in response to temperature changes of the mixed water supplied to the outlet 90. More particularly, an increase in mixed water temperature above a predetermined value will cause the thermostatic element 92 to adjust or move, thereby moving the slide 88 in a direction reducing the cross-sectional flow path of the hot water openings 86. The thermostatic element 92 will close the hot water openings 86 when the temperature of the mixed water supplied to the outlet 90 exceeds a predetermined temperature (illustratively 120 degrees Fahrenheit (48.89 degrees Celsius)). In a similar manner, a decrease in mixed water temperature below a predetermined value will cause the thermostatic element 92 to urge the slide 88 in a direction reducing the cross-sectional flow path of the cold water openings 84. As such, the thermostatic cartridge 74 is configured to provide high temperature and low temperature limits in accordance with ASSE 1070 and ASSE 1016.

A control stem 94 is operably coupled to an adjustment member 96, such that rotation of the control stem 94 causes axial movement of the adjustment member 96. An upper end 98 of the adjustment member 96 is coupled to the handle 41, while a lower end 102 of the adjustment member 96 is configured to cooperate with the slide 88. More particularly, rotation of the control stem 94 by the handle 41 causes the adjustment member 96 to move the slide 88, thereby altering the flow sections of water flowing through openings 84 and 86, and determining the temperature of the mixed water leaving the outlet 90. Additional details of illustrative thermostatic cartridges are provided in U.S. Pat. Nos. 6,085,984 and 6,557,770, the disclosures of which are expressly incorporated by reference herein.

As noted above, portions of the thermostatic cartridge 74 are received within the flow divider 76 and the tri-axial adapter 78. As shown in FIG. 7, the flow divider 76, in combination with the tri-axial adapter 78 and the holder 60, define hot and cold water passageways 104 and 106 for the flow of hot and cold water (represented by arrows 105 and 107 in FIG. 7). While the illustrative embodiment shows the flow divider 76, the tri-axial adapter 78, and the thermostatic cartridge 74 as separate elements, it should be appreciated that some or all of these components could be formed as an integral unit.

The flow divider 76 includes a body 108 illustratively formed of a molded thermoplastic, such as a glass fiber reinforced polysulfone. The body 108 includes a sidewall 110 having a generally oval shape formed by substantially straight portions 112 and arcuate portions 114 (FIG. 3) configured to cooperate with the flat portions 68 and the arcuate portions 69 of the holder 60. A recessed portion 116 of sidewall 110 includes laterally extending passages 118 which are in fluid communication with the upper openings 84 of the thermostatic cartridge 74. A retaining portion 120 of body 108 includes a groove 122 for receiving an o-ring 124 which sealingly engages the holder 60. Similarly, the inner surface 125 of the arcuate portions 114 of the body 108 include standoffs or ribs 127 which are configured to maintain a clearance with the tri-axial adapter 78 and thereby define a portion of the hot water passageway 104. The outer surface 126 of the arcuate portions 114 of the body 108 includes standoffs or ribs 128 which are configured to maintain a clearance with the body of the holder 60 and thereby define a portion of the cold water passageway 106. More particularly, the cold water passageway 106 extends between the inner surface 130 of the body of the holder 60 and the outer surface 126 of the body 108 of the flow divider 76.

The flow divider 76 further includes a lower portion 140 having a pair of standoffs 132 extending downwardly from the straight portions 112 of the sidewall 110 (FIGS. 3 and 4). A pair of locking tabs 134 extend downwardly from the arcuate portions 114 of the sidewall 110 and include slots 136 configured to receive latches 138 supported by the tri-axial adapter 78 (FIGS. 3 and 7).

With further reference to FIGS. 3, 7, and 8, an upper portion 140 of the tri-axial adapter 78 is received within the lower portion 140 of the flow divider 76. The tri-axial adapter 78 is illustratively molded from a thermoplastic, such as a nylon resin. The tri-axial adapter 78 includes a hot water inlet port 144 and a cold water inlet port 146 extending downwardly from a base 148. An outlet 150 is formed within base 148 and is in communication with an outlet passageway 152 extending axially through the adapter 78 and in fluid communication with the outlet 90 of the thermostatic cartridge 74. The outlet water line 48 is in fluid communication with the outlet 150. The inlet ports 144 and 146 and the outlet port 150 are substantially coaxially aligned and extend substantially parallel to the longitudinal axis 72 defined by the thermostatic cartridge 74.

The base 148 of the tri-axial adapter 78 has a shape cooperating with the holder 60 and includes a peripheral groove 154 receiving an o-ring 156. The o-ring 156 provides sealing engagement between the adapter 78 and the holder 60. An intermediate support 158 is positioned above the base 148 and has a shape cooperating with the flow divider 76. The support 158 includes a peripheral groove 160 receiving an o-ring 162 for providing sealing engagement between the adapter 78 and the flow divider 76. An opening 163 is formed within the base 148 and provides fluid communication between the cold water inlet port 146 and a channel 164 (FIG. 7). The channel 164 is defined between the base 148 and the intermediate support 158 and forms part of the cold water passageway 106. An opening 166 within the intermediate support 158 is in fluid communication with the hot water inlet port 144 and forms part of the hot water passageway 104 (FIG. 7).

It should be appreciated that the o-rings 124 and 156 sealingly engage the body 62 of the holder 60. As such, the thermostatic cartridge 74 is sealingly received within the body 62 which, in turn, defines a substantially water-tight container.

An upper receiver 168 is supported above the intermediate support 158 and includes a cylindrical sidewall 170. The sidewall 170 concentrically receives the lower end 82*b* of the housing 82 of the thermostatic cartridge 74. O-ring 83 provides a seal between the sidewall 170 and the housing 82. As such, the outlet 90 of the thermostatic cartridge 74 is in fluid communication with the upper receiver 168 which defines part of the outlet passageway 152.

The hot water inlet port 144 includes a tubular member 174 extending downwardly from the base 148. Similarly, the cold water inlet port 146 includes a tubular member 176 extending downwardly from the base 148. A hot water check valve 178 is removably received within the tubular member 174, while a cold water check valve 180 is removably received within the tubular member 176. The check valves 178 and 180 are positioned upstream from the thermostatic cartridge 74 and are configured to prevent the cross-flow of water between the hot water inlet 44 and the cold water inlet 46. Illustratively, the check valves 178 and 180 may be Part No. OV15 check valves available from Neoperl of Waterbury, Conn.

As detailed herein, the hot water passageway 104 and the cold water passageway 106 are defined by the cooperation of the holder 60, the flow divider 76, the tri-axial adapter 78, and the thermostatic cartridge 74. The hot water passageway 104 extends within the tri-axial adapter 78 from the hot water inlet port 144, through the hot water check valve 178 received within the tubular member 174, and through opening 166 formed within the intermediate support 158. The hot water passageway 104 continues between the sidewall 170 of the tri-axial adapter 78 and the sidewall 110 of the flow divider 76, and directs hot water into the lower openings 86 of the thermostatic cartridge 74. The cold water passageway 106 extends within the tri-axial adapter 78 from the cold water inlet port 146, through the cold water check valve 180 received within the tubular member 176, and through opening 163 into the channel 164 defined between the base 148 and the intermediate support 158. The cold water passageway 106 continues between the sidewall 110 of the flow divider 76 and the sidewall 63 of the holder 60, and directs cold water through passages 118 into the upper openings 84 of the thermostatic cartridge 74. The outlet passageway 152 extends axially through the tri-axial adapter 78 from the outlet 90 of the thermostatic cartridge 74 to the outlet port 150.

The cap 80 is supported by the flow divider 76 and illustratively includes a base 184 having notches 186 configured to cooperate with upwardly extending tabs 188 formed on the retaining portion 120 of the flow divider 76. The cooperation between the notches 186 and the tabs 188 facilitate proper orientation of, and prevent rotation between, the cap 80 and the flow divider 76. The upper portion of the thermostatic cartridge 74 is received within a chamber 190 defined by the cap 80. Internal teeth or splines 192 are formed within the chamber 190 of the cap 80 and are configured to engage external teeth or splines 194 formed on the thermostatic cartridge 74. A cold temperature stop 196 extends upwardly from the cap 80 and is properly positioned relative to the thermostatic cartridge 74 through use of the cooperating splines 192 and 194 of the cap 80 and thermostatic cartridge 74. The stop 196 is engageable with a limit member 198 supported by the handle 100 to prevent counter-clockwise rotation beyond a desired point. The cap 80 may be formed of any suitable material and is illustratively molded from a nylon resin.

A high temperature limiter 200 is operably coupled to the cap 80. More particularly, the high temperature limiter 200 includes a plurality of internal teeth or splines 202 configured to engage with the external teeth or splines 204 of the cap 80. A hot temperature stop 206 extends upwardly from the limiter 200 and is engageable with the limit member 198 of the handle 100 to prevent clockwise rotation beyond a desired point. Engagement between the splines 202 and 204 keep the high temperature limiter 200 properly oriented relative to the cap 80. As with the cap 80, the high temperature limiter 200 is illustratively molded from a thermostatic resin, such as nylon.

A receiver 210 is fluidly coupled to the hot water inlet line 44, the cold water inlet line 46, and the outlet water line 48. The receiver 210 is illustratively formed of a metal, such as brass, which is brazed to the water lines 44, 46, and 48. The receiver 210 includes sockets 212 and 214 configured to releasably fluidly coupled with the tubular members 174 and 176 of the tri-axial adapter 78. O-rings 216 and 218 are supported by the tubular members 174 and 176 and provide seals between the adapter 78 and the receiver 210. The receiver 210 is positioned at the bottom of the body 62 of the holder 60 and is illustratively secured in place via a washer cup 220 operably coupled to the bottom of the body of the holder 60 through a plurality of fasteners, such as screws 222. As shown in FIG. 6B, the lower end 66 of the body 62 includes an end wall 225 having an opening 227 and apertures 229 formed therein. The water lines 44, 46, and 48 extend through the opening 227, and screws 222 pass through apertures 229. The end wall 225 may be formed during the drawing process detailed herein, and is integral with the sidewall 63. The opening 227 and apertures 229 may be formed in a stamping operation. An o-ring 223 may be received intermediate the receiver 210 and the holder 60 to provide a seal therebetween. An o-ring 223 may be received intermediate the receiver 210 and the holder 60 to provide a seal therebetween.

A first keeper or retainer 224 is configured to retain the thermostatic valve assembly 70 within the holder 60. As detailed above, the body 62 of the holder 60 has a generally oval cross-sectional shape defined by sidewall 63 having a pair of flat portions 68 connected by a pair of arcuate portions 69. The retainer 224 as shown in FIG. 3 comprises an eccentric ring 232 having outside tabs or corners 234 configured to be received within slots 236 having at least one open end formed within the sidewall 226 of the holder 60. As may be appreciated, the ring 232 may be inserted within the cooperating body 62 of the holder 60 and then rotated such that the corners 234 engage with the slots 236. A plurality of fasteners, such as screws 238, may be utilized to secure the retainer 224 to the cap 80. In an illustrative embodiment, the slots 236 are formed within the body 62 through a stamping process.

A trim ring or escutcheon 240 includes internal threads 242 which are configured to threadably engage with external threads 244 of the cap 80. The handle 41 is supported by the stem 94 of the thermostatic cartridge 74 above the escutcheon 240.

The holder 60 is configured to pass through opening 306 and to be secured to the deck 14 through the use of upper and lower securing members 246 and 248. The lower securing member 248 is configured to move vertically along a pair of adjustment members 250a and 250b. The adjustment members 250a and 250b illustratively extend parallel to the longitudinal axis 72 and may comprise jack screws having external threads 252 extending along at least a portion thereof. The adjustment members 250a and 250b each further include a tool mating head 254 at an upper end thereof and accessible via a conventional tool, such as a screw driver. A lower end 256 of each adjustment member 250a and 250b is received within a pocket 258a and 258b of the cup.

In an illustrative embodiment, the lower securing member 248 includes an annular body 260 having threaded openings 262a and 262b which engage the threads 252 of the adjustment members 250a and 250b, respectively. As such, when the adjustment members 250a and 250b are rotated, the lower securing member 248 moves along the holder 60, toward or away from the upper securing member 246 depending upon the direction of rotation of the adjustment members 250a and 250b. Illustratively, the lower securing member 248 includes an opening 263 having a double-D cross-section to accommodate the body 62. More particularly, the double-D configuration prevents the securing member 248 from rotating relative to the body 62 when the adjustment members 250 are turned.

Figure 9:
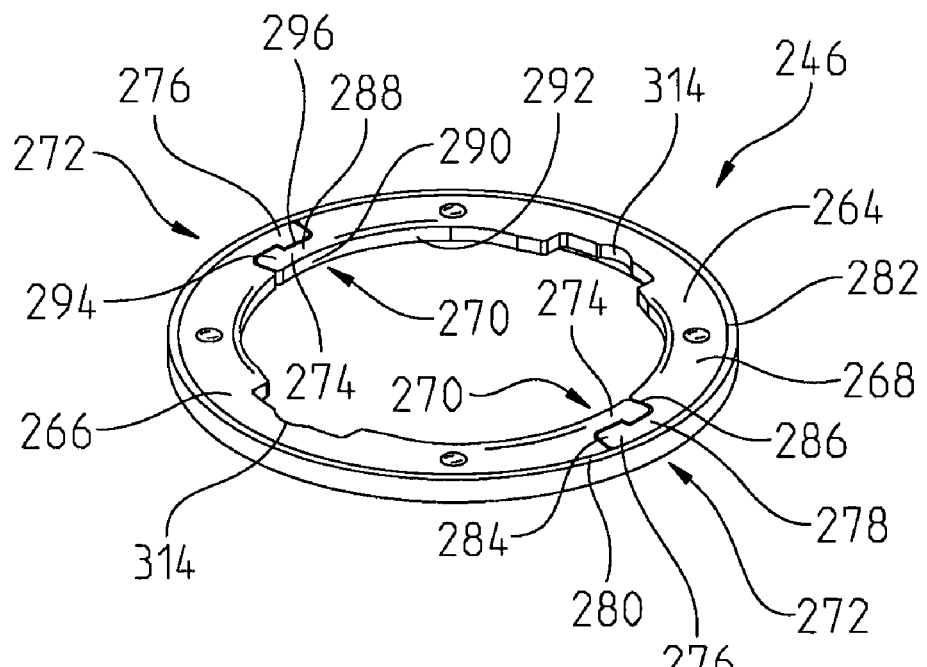
FIG. 9 is a perspective view of a retaining flange of the thermostatic faucet of FIG. 1, showing the retaining flange in an operative or assembled mode.
Figure 10:
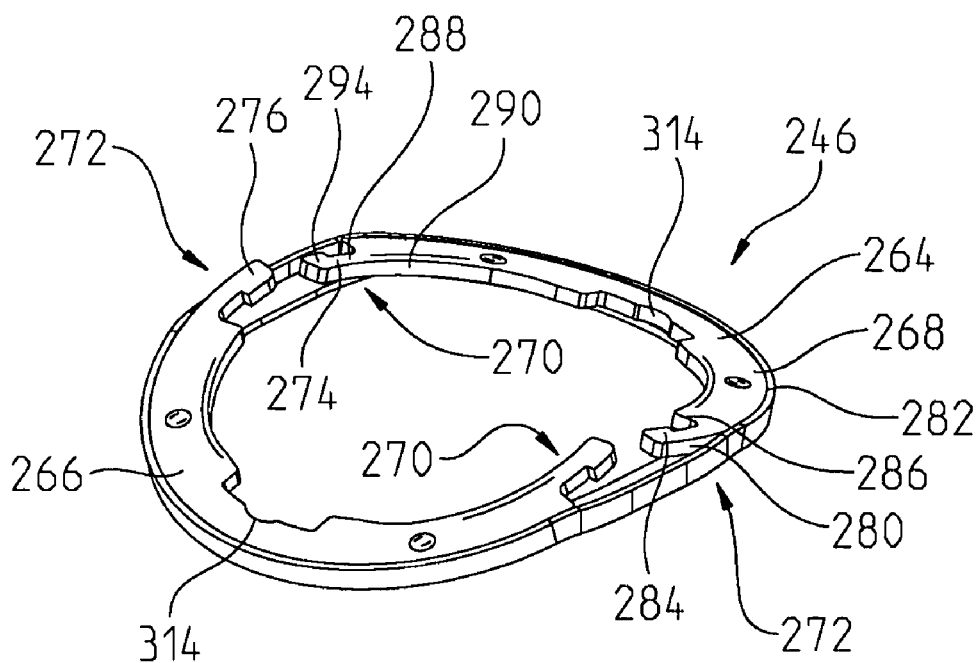
FIG. 10 is a perspective view of the retaining flange of FIG. 9, showing the retaining flange in a disengaged or released mode.

With reference to FIGS. 3, 9, and 10, the upper securing member 246 illustratively comprises a bend-and-lock flange 264 having cooperating first and second arcuate members 266 and 268. The arcuate members 266 and 268 are substantially identical and include opposing ends 270 and 272 supporting interlocking members 274 and 276, respectively. With reference to FIGS. 8 and 9, each interlocking member 276 includes an arm 278 having an outer surface 280 continuous with an arcuate outside edge 282. The arm 278 supports a radially inwardly extending locking tab 284. A radially outwardly extending receiving notch 286 is formed within the arm 278. Each interlocking member 274 includes an arm 288 having an inner surface 290 continuous with an arcuate inside edge 292. The arm 288 supports a radially outwardly extending locking tab 294. A radially inwardly extending receiving notch 296 is formed within the arm 288. As may be appreciated, radially inwardly extending locking tab 284 of interlocking member 276 is receivable within the radially inwardly extending receiving notch 296 of interlocking member 274. Similarly, radially outwardly extending locking tab 294 of interlocking member 274 is receivable within the radially outwardly extending receiving notch 286 of interlocking member 276, thereby coupling the members 274 and 276 together and forming a complete flange 264.

Figure 11:
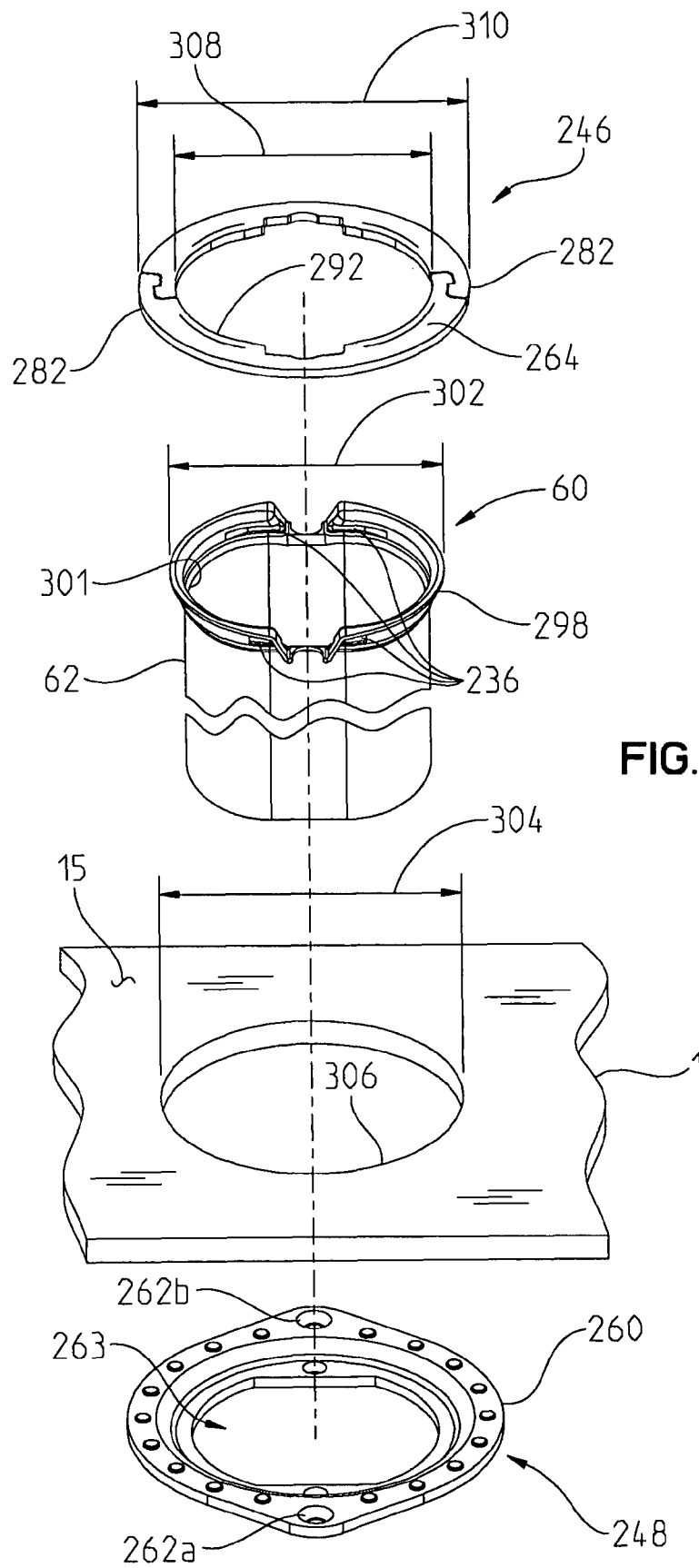
FIG. 11 is a partial exploded perspective view showing the holder, the retaining flange, and the lower securing member for coupling to the deck.

With reference to FIGS. 3, 5, and 11, the flange 264 is configured to be supported above the deck 14 and below a retaining lip 298 formed at the upper end of the body 62 of the holder 60. More particularly, the retaining lip 298 extends radially outwardly from the body 62 and includes clearance notches 300 for providing access to the heads 254 of the adjustment members 250. The retaining lip 298 may be formed during the drawing process as detailed above, and is integral with the sidewall 63. An annular recess 301 (FIG. 11) is defined by the retaining lip 298 within an inside surface of the body 62 and permits for the passage of seals 124 and 156 without interfering with (i.e., catching or snagging) on slots 236.

The outer diameter 302 of the retaining lip 298 is configured to be less than the diameter 304 of the mounting hole 306 formed within the deck 14, thereby permitting the holder 60 to pass completely through the hole 306 from below during installation, as necessary (FIG. 11). In one illustrative embodiment, the diameter 304 of the mounting hole 306 is between approximately 2.25 inches (57 millimeters) and 2.38 inches (60.5 millimeters), while the outer diameter 302 of the retaining lip 298 is approximately 2.2 inches (56 millimeters). Illustratively, the holder 60 is sized to fit within a dimensional envelope 307 having a lateral cross-sectional diameter 309 (FIG. 6A) of less than 2.5 inches (63.5 millimeters), and illustratively equal to the 2.2 inches (56 millimeters) of the outer diameter 302 of the retaining lip 298.

With further reference to FIG. 11, the flange 264 has an inner diameter 308, defined by the opposing inside edges 292, that is less than the outer diameter 302 of the retaining lip 298. As such, the holder 60 may not pass downwardly through the flange 264. In one illustrative embodiment, the inner diameter 308 of the flange 264 is approximately 2.05 inches (52 millimeters). Similarly, the flange 264 has an outer diameter 310, defined by the opposing outside edges 282, that is greater than the diameter 304 of the deck hole 306, thereby preventing the flange 264 from passing downwardly therethrough. In other words, the flange 264 is retained intermediate the deck 14 and the retaining lip 298 to secure the body 62 of the holder 60 to the deck 14. In one illustrative embodiment, the outer diameter 310 of the flange is approximately 2.64 inches (67 millimeters).

A resilient gasket 312 may be supported intermediate the flange 264 and the deck 14. Further, each annular member 266 and 268 of the flange 264 may include clearance notches 314 for receiving the adjustment members 250 and providing access to the respective heads 254.

Figure 12:
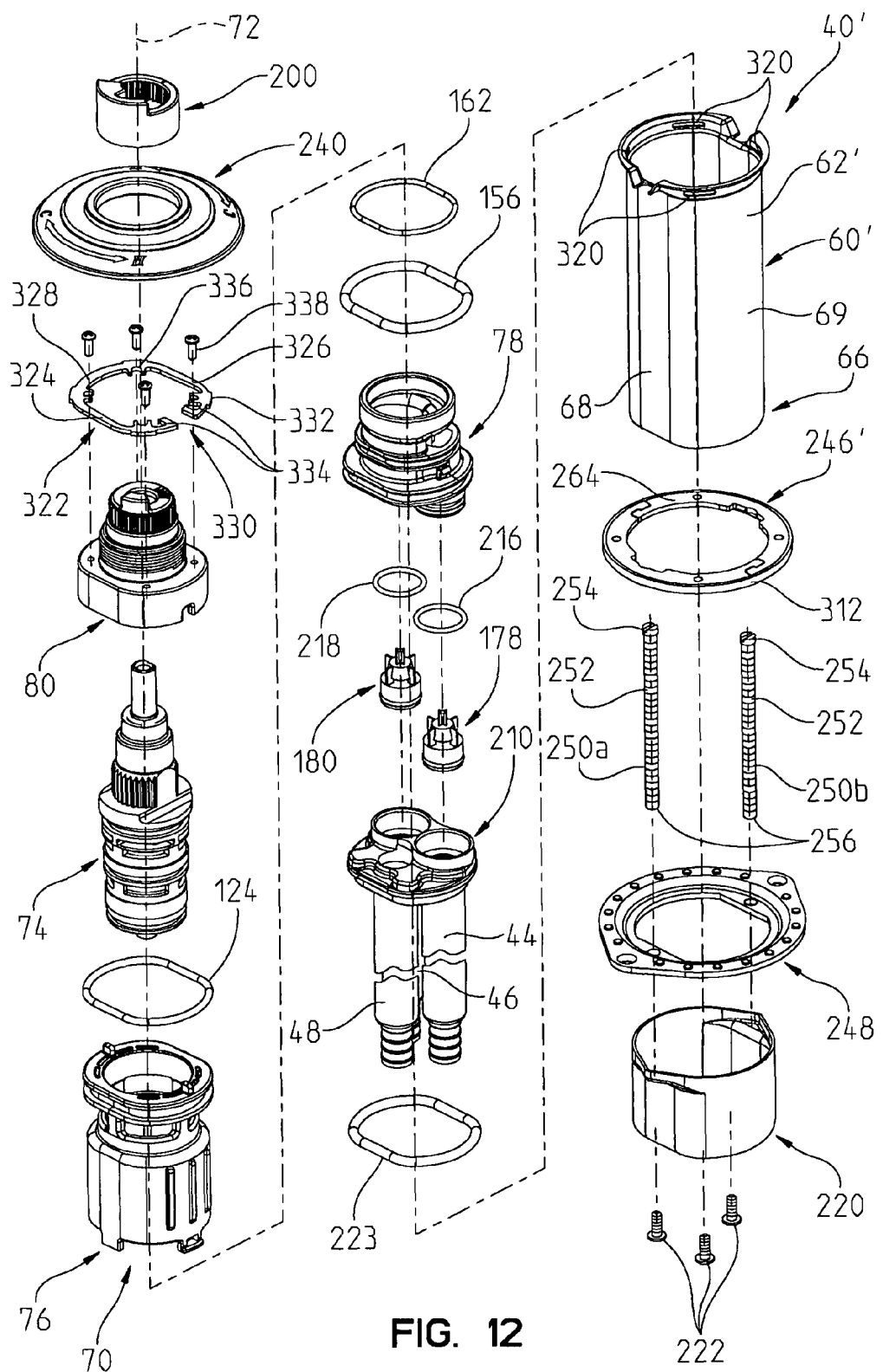
FIG. 12 is an exploded perspective view of a further illustrative embodiment temperature control unit of the thermostatic faucet of FIG. 1.

Referring now to FIG. 12, a further illustrative embodiment temperature control unit 40' is illustrated. The temperature control unit 40' of FIG. 12 includes many similar components of the temperature control unit 40' of FIG. 3. As such, similar components are identified by like reference numerals.

With further reference to FIGS. 3 and 12, the resilient gasket 312 is coupled to the annular members 266 and 268 of the flange 264. The attached gasket 312 is illustratively formed of a resilient material, such as an elastomer, thereby coupling the annular members 266 and 268 in proximity to each other while allowing relative movement to facilitate installation over the retaining lip 298 of the holder 60. In the illustrative embodiment of FIG. 3, the resilient gasket 312 may be coupled to the flange 264 using conventional coupling means, such as adhesive bonding. In the illustrative embodiment of FIG. 12, the gasket 312 is insert molded to the annular members 266 and 268.

The holder 60' of FIGS. 12, 13A, and 13B, includes a valve body 62' similar to that identified above with respect to FIG. 3. However, the body 62' of FIGS. 12, 13A, and 13B includes a plurality of closed ended slots 320 configured to operably couple with a snap ring keeper or retainer 322. The snap ring retainer 322 includes first and second outwardly biased arms 324 and 326 coupled at a connector 328 and terminating at an opening 330. Tabs 332 are supported at the corners of the retainer 322. As may be appreciated, forcing the arms 324 and 326 toward one another causes the tabs 332 to move radially inwardly such that the retainer 322 may be positioned within the body 62'. Releasing the arms 324 and 326 of the retainer 322 causes the tabs 332 to move radially outwardly and into engagement with the slots 320. Again, the slots 320 may be formed in the body 62' through a stamping operation.

Receiving portions 334 are defined on the arms 324 and 326 proximate the opening 330 in order to facilitate a use of a tool, such as a needlenose pliers, to force the arms 324 and 325 inwardly. Coupling notches 336 are formed proximate each tab and positioned radially inwardly therefrom. The coupling notches 336 are configured to receive fasteners, such as screws 338, for engagement with the cap 80 of the thermostatic valve assembly. The external tabs 332 on the retainer 322 interface with the slots 320 on the valve body 62' to retain the cartridge assembly. The retaining screws 338 may be in any arrangement to prevent accidental disengagement of the retainer 322 from the body 62'. In further illustrative embodiments, any number of screws 338 may be utilized or a clip-on member may be positioned and/or attached to the cap or valve body which inhibits compression of the snap ring arms 324 and 326.

Figure 14:
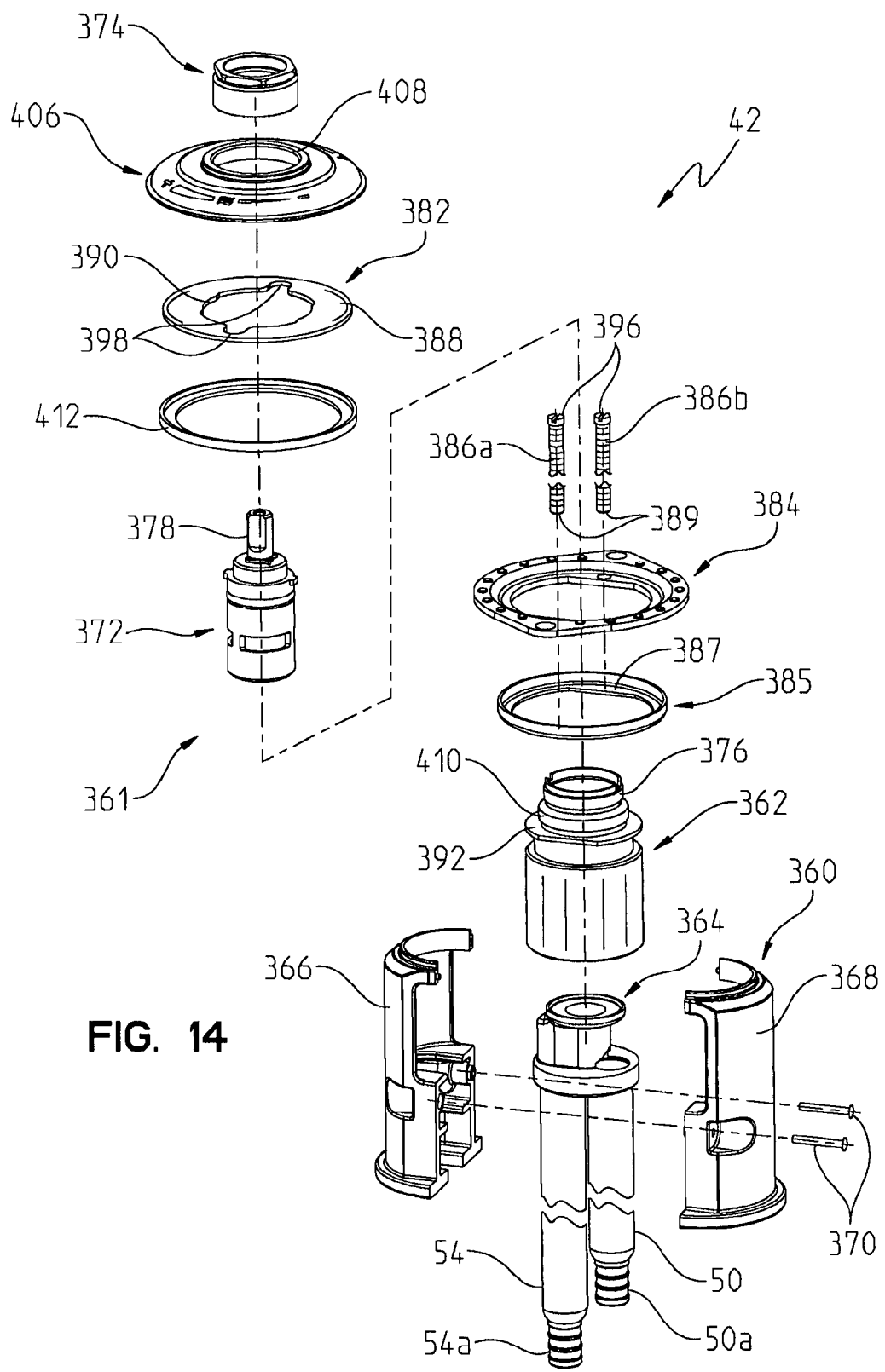
FIG. 14 is an exploded perspective view of the flow control unit of the thermostatic faucet of FIG. 1.
Figure 15:
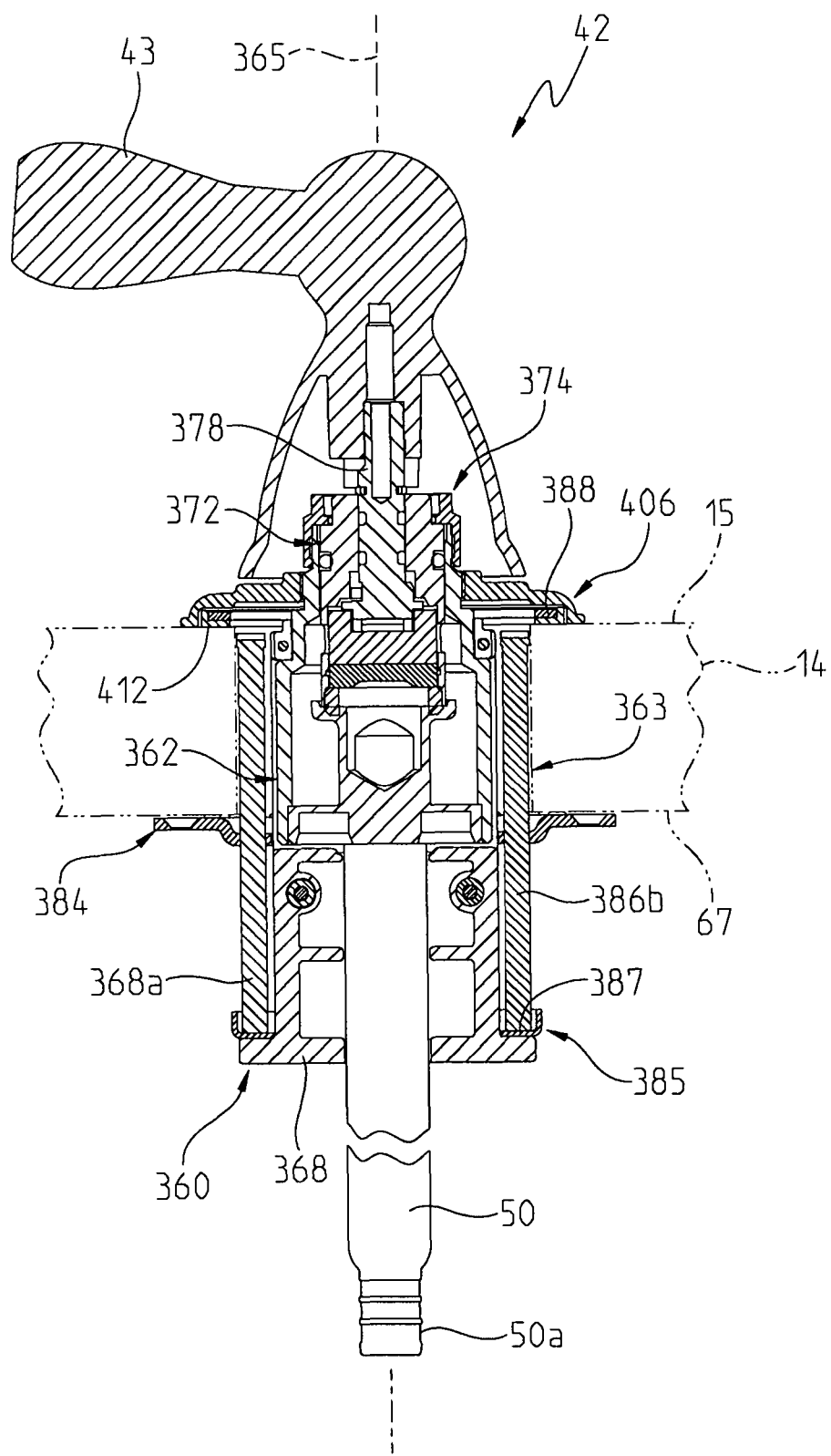
FIG. 15 is a cross-sectional view of the flow control unit, taken along line 15-15 of FIG. 2.

Referring now to FIGS. 14 and 15, an illustrative embodiment volume or flow control unit 42 is shown as including a housing 360 coupled to a second holder or valve body 362 which, in turn, receives a second or flow control valve assembly 361. The second holder 362 of the flow control unit 42 is supported by the mounting deck 14 in a spaced relationship to the first holder 60 of the temperature control unit 40. More particularly, the second holder 362 extends downwardly through a mounting hole 363 formed within the deck 14. The flow control valve assembly 361 is fluidly coupled with a base 364 and defines a vertically extending longitudinal axis 365. The housing 360 illustratively includes first and second portions or clamshells 366 and 368 which are coupled together using a conventional fastener, such as rivets 370. The portions 366 and 368 may be molded from a thermoplastic material. The valve body 362 may be of conventional design and is illustratively formed of brass. The valve body 362 operably couples to the base 364, which may also be illustratively formed of brass. Inlet 50 and outlet 54, illustratively copper tubes, are fluidly coupled to the base 364 and are illustratively brazed thereto. In one illustrative embodiment, the valve body 362, the base 364, the inlet 50, and the outlet 54 are all brazed together simultaneously to reduce brazing cycle time and workcenter costs.

The flow control valve assembly 361 illustratively comprises a conventional flow control valve cartridge 372 illustratively received within the body 362. The valve cartridge 372 is configured to control the flow of mixed water received from the inlet 50 passing to the outlet 54. In the illustrative embodiment, the valve cartridge 372 comprises Model Lifetime 218 available from Fluehs Corporation of Lüdenscheid, Germany. A second retainer, illustratively a bonnet nut 374 threadably receives a threaded upper end 376 of the body 362, thereby securing the valve cartridge 372 therein. An upwardly extending stem 378 of the valve cartridge 372 is operably coupled to the handle 43 and secured thereto by conventional means, such as a set screw.

Upper and lower securing members 382 and 384 are configured to operably couple the flow control unit 42 to mounting deck 14. The lower securing member 384 is substantially similar to the lower securing member 248 detailed above. The lower securing member 384 is illustratively supported for movement along adjustment members 386a and 386b. More particularly, the adjustment members 386 illustratively comprise jack screws similar to jack screws 250 detailed above with respect to the temperature control unit 40. A bottom support 385 is supported by a lower end of the holder 360 and provides bearing surfaces 387 for the lower ends 389 of the jack screws 386.

The upper securing member 382 illustratively comprises a washer 388 including an eccentric aperture 390 configured to slidably pass over a retaining flange 392 of the valve body 362. The retaining flange 392 includes arcuate flanges 394 which are configured to cooperate with the washer 388 when rotated with respect thereto. More particularly, the washer 388 is configured to slidably pass over the retaining flange 392 of the valve body and then to be rotated to a locked position wherein the washer 388 is retained beneath the retaining flange 392 and above the holder 360. The heads 396 of the jack screws 386 are accessible through notches 398 formed within the washer 388. As shown in FIG. 12, the retaining flange 392 of valve body 362 is supported above the upper surface 15 of the deck 14 by the washer 388. Rotation of the jack screws 386 causes the lower securing member 384 to move relative to the washer 388, such that the deck 14 is clamped therebetween.

An escutcheon 406 illustratively includes internal threads 408 which are configured to threadably engage external threads 410 formed on the valve body 362. A resilient gasket 412, illustratively formed of an elastomer, may be positioned within the escutcheon 406 intermediate the washer 388 and the deck 14.

Additional details of an illustrative valve mounting structure are provided in U.S. Pat. No. 7,175,158, the disclosure of which is expressly incorporated by reference herein.

Installation of the temperature control unit 40 is accomplished by first inserting the holder 60, containing the thermostatic valve assembly 70, through the mounting hole 306 from the bottom of the deck 14. As noted above, the retaining lip 298 of the holder 60 is sized to fit through the hole 306. The arcuate members 266 and 268 of the flange 264 are separated and passed over the retaining lip 298 of the holder 60 from above the deck 14. The interlocking members 274 and 276 are then engaged to complete the flange 264 positioned intermediate the retaining lip 298 and the upper surface 15 of the deck 14. At this point, the lower securing member 248 is below the lower surface 67 of the deck, causing the temperature control unit 40 to be loosely supported by the deck 14.

Next, a screwdriver (not shown) is alternately engaged with the heads 254 of the jack screws 250a and 250b and rotated. Rotation of the jack screws 250a and 250b causes the lower securing member 248 to move upwardly toward the deck 14, thereby pulling the lower securing member 248 toward the flange 264. Continued rotation of the jack screws 250a and 250b causes the deck 14 to be clamped between the upper and lower securing member 246 and 248.

The flow control unit 42 is installed in a manner similar to the temperature control unit 40. However, the upper securing member 382 comprises the washer 388 which is rotated into an engaged position below the flange 392 of the valve body 362. Jack screws 386a and 386b are rotated to move the lower securing member 384 upwardly to cooperate with the upper securing member 382 and clamp the deck 14 therebetween.

As may be appreciated, the operative components of the temperature control unit 40 and the flow control unit 42 are configured for removal and service from above the deck 14 without requiring removal of the respective holders. More particularly, the thermostatic valve assembly 70, including the thermostatic cartridge 74, flow divider 76, and tri-axial adapter 78, may be removed from above the upper surface 15 of the deck 14 by removing the retainer 224, 322 from the body 62 of the holder 60. To access the retainer 224, 322, the escutcheon 240 is unthreaded from the cap 80. Once the retainer 224, 322 is removed, the thermostatic valve assembly 70 may be removed from the holder 60 in a vertical direction along the longitudinal axis 72 through the opening 306 in the deck 14. The tri-axial adapter 78 is fluidly uncoupled from the receiver 210, and thus from the hot water inlet line 44, the cold water inlet line 46, and the outlet water line 48. The hot temperature limiter 200 and the cap 80 may be removed by hand, while a tool, such as pliers, may be used to grasp tabs 188 on the flow divider 76 to assist in its removal from the holder 60. Once removed, the thermostatic cartridge 74 may be serviced. Also, the check valves 178 and 180 may be serviced and/or replaced. The flow control valve assembly 361 may also be removed from above the upper surface 15 of the deck 14 by removing the retainer 374 from the valve body 262.

While the above illustrated embodiment shows a temperature control unit 40 separate from a flow control unit 42, in further illustrative embodiments, a hot flow control unit and a cold flow control unit may be substituted therefor. More particularly, the thermostatic valve assembly detailed above could be incorporated into the architecture of a traditional two-handle widespread faucet with separate hot and cold valves. A single thermostatic cartridge would be utilized and would provide anti-scald protection by pre-mixing the flow delivered from the hot valve control, such that the maximum temperature of the hot fluid delivered via the hot valve to the mixed water outlet would be at a set maximum, illustratively 120 degrees Fahrenheit (48.89 degrees Celsius), or less. The cold valve and corresponding cold flow would have no thermostatic components present. As such, there would be considered an "unprotected cold supply." As such, this alternate configuration would not generally provide for thermal shock (cold spike) protection of the outflow in the event of a hot water pressure decrease or a cold water pressure increase. Rather, thermostatic mixing would occur only in the hot valve of the faucet. However, this embodiment could provide scald protection to control the maximum outlet temperature in accordance with the temperature regulation requirements of ASSE 1070. Similar to the above-detailed embodiment, the thermostatic cartridge and the cartridge elements would be constructed of plastic and composite materials would incorporate the tri-axial flow adapter, and would be serviceable from above the deck or sink rim.

Although the invention has been described in detail with reference to certain preferred embodiments, variations and modifications exist within the spirit and scope of the invention as described and defined in the following claims.

The invention claimed is:

1. A valve assembly for controlling water flow to a water delivery device, the valve assembly comprising:
   a valve body formed of a malleable metal and including a sidewall extending between opposing first and second ends along a longitudinal axis, the sidewall including a wall thickness, and a length between the first and second ends;
   wherein the sidewall defines a cross-sectional major dimension extending laterally relative to the longitudinal axis, and a cross-sectional minor dimension extending laterally relative to the longitudinal axis and perpendicular to the cross-sectional major dimension, the ratio of the length to the major dimension being greater than 1, and the ratio of the major dimension to the wall thickness being greater than 30; and
   a valve cartridge sealingly received within valve body, such that the valve body is substantially water-tight.

2. The valve assembly of claim 1, wherein the valve body is formed from a lead-free material.

3. The valve assembly of claim 2, wherein the valve body is formed of stainless steel.

4. The valve assembly of claim 1, wherein the sidewall has a thickness between 0.01 inches and 0.125 inches.

5. The valve assembly of claim 4, wherein the sidewall has a thickness substantially equal to 0.060 inches and a major dimension substantially equal to 2 inches.

6. The valve assembly of claim 1, wherein the valve body includes a retaining lip integrally formed and extending outwardly from the sidewall proximate the first end.

7. The valve assembly of claim 1, wherein the valve body includes a plurality of slots stamped within the sidewall proximate the first end.

8. The valve assembly of claim 7, further comprising a retainer including a plurality of tabs configured to be received within the plurality of slots formed within the valve body, the retainer configured to retain the valve cartridge within the valve body.

9. The valve assembly of claim 1, wherein the valve body further includes an end wall integrally formed with the sidewall at the second end, the end wall including a stamped opening for receiving a plurality of conduits fluidly coupled to the valve cartridge.

10. The valve assembly of claim 9, further comprising a receiver coupled to the second end of the valve body, the receiver fluidly coupling the plurality of conduits with the valve cartridge.

11. The valve assembly of claim 1, wherein the valve body has a non-circular cross-section defined by opposing arcuate portions and planar portions of the sidewall.

* * * * *